US006753812B2

(12) United States Patent
Rabinowitz et al.

(10) Patent No.: US 6,753,812 B2
(45) Date of Patent: Jun. 22, 2004

(54) TIME-GATED DELAY LOCK LOOP TRACKING OF DIGITAL TELEVISION SIGNALS

(75) Inventors: Matthew Rabinowitz, Portola Valley, CA (US); James J. Spilker, Jr., Woodside, CA (US)

(73) Assignee: Rosum Corporation, Redwood City, CA (US)

(*) Notice: Subject to any disclaimer, the term of this patent is extended or adjusted under 35 U.S.C. 154(b) by 0 days.

(21) Appl. No.: 10/209,578

(22) Filed: Jul. 31, 2002

(65) Prior Publication Data

US 2003/0058167 A1 Mar. 27, 2003

Related U.S. Application Data

(63) Continuation of application No. 10/054,262, filed on Jan. 22, 2002, now abandoned, and a continuation-in-part of application No. 09/877,158, filed on Jun. 21, 2001, now abandoned.
(60) Provisional application No. 60/265,675, filed on Feb. 2, 2001, provisional application No. 60/281,270, filed on Apr. 3, 2001, provisional application No. 60/281,269, filed on Apr. 3, 2001, provisional application No. 60/293,812, filed on May 25, 2001, provisional application No. 60/293,813, filed on May 25, 2001, and provisional application No. 60/293,646, filed on May 25, 2001.

(51) Int. Cl.[7] ................................ G01S 3/02
(52) U.S. Cl. ...................... 342/464; 342/463
(58) Field of Search .................. 342/463, 464

(56) References Cited

U.S. PATENT DOCUMENTS

| 4,555,707 A | 11/1985 | Connelly |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,398,034 A | 3/1995 | Spilker, Jr. |
| 5,481,316 A | 1/1996 | Patel |
| 5,510,801 A | 4/1996 | Engelbrecht et al. |
| 5,774,829 A | 6/1998 | Cisneros et al. |
| 5,920,284 A | 7/1999 | Victor |
| 5,952,958 A | 9/1999 | Speasl et al. |
| 6,078,284 A | 6/2000 | Levanon |
| 6,094,168 A | 7/2000 | Duffett-Smith et al. |

(List continued on next page.)

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.
Spilker, Jr., J.J., "Fundamentals of Signal Tracking Theory," *Global Positioning System: Theory and Applications* (1994), vol. 1, Chapter 7, pp. 245–327.
Van Dierendock, A.J., "GPS Receivers," *Global Positioning System: Theory and Applications* (1995), vol. 1, Chapter 8, pp. 329–407.

*Primary Examiner*—Theodore M. Blum
(74) *Attorney, Agent, or Firm*—Richard A. Dunning, Jr.

(57) ABSTRACT

A computer program product, apparatus, and method for use in determining the position of a user terminal includes receiving at the user terminal a digital television (DTV) broadcast signal transmitted by a DTV transmitter; tracking a periodic component of the DTV signal using a delay-lock loop (DLL), including selecting an observation interval based on the timing of the periodic component, and turning on a portion of the DLL during the observation interval, and turning the portion off otherwise; and determining a pseudo-range between the user terminal and the DTV transmitter based on the DTV broadcast signal; and wherein the position of the user terminal is determined based on the pseudo-range and a location of the DTV transmitter.

52 Claims, 14 Drawing Sheets

U.S. PATENT DOCUMENTS

| | | |
|---|---|---|
| 6,107,959 A | 8/2000 | Levanon |
| 6,137,441 A | 10/2000 | Dai et al. |
| 6,317,500 B1 | 11/2001 | Murphy |
| 6,373,432 B1 | 4/2002 | Rabinowitz et al. |
| 6,374,177 B1 | 4/2002 | Lee et al. |

500 ⟶

| 4 | 511 Symbols | 63 | 63 | 63 | 128 |

| 4 | 828 Symbols |

FIG. 6

TIME-GATED DELAY LOCK LOOP TRACKING OF DIGITAL TELEVISION SIGNALS

CROSS-REFERENCE TO RELATED APPLICATIONS

This application is a continuation of U.S. Non-provisional patent application Ser. No. 10/054,262, "Time-Gated Delay Lock Loop Tracking Of Digital Television Signals," by Matthew Rabinowitz and James J. Spilker, filed Jan. 22, 2002, the disclosure thereof incorporated by reference herein in its entirety. This application is a a continuation-in-part of copending U.S. Non-provisional patent application Ser. No. 09/887,158, "Position Location using Broadcast Digital Television Signals," by Matthew Rabinowitz and James J. Spilker, filed Jun. 21, 2001, the disclosure thereof incorporated by reference herein in its entirety.

This application claims the benefit of U.S. Provisional Patent Application Serial No. 60/265,675, "System and Method for Navigation and/or Data Communication Using Satellite and/or Terrestrial Infrastructure," by Matthew Rabinowitz and James J. Spilker, filed Feb. 2, 2001; Ser. No. 60/281,270, "Use of the ETSI DVB Terrestrial Digital TV Broadcast Signals For High Accuracy Position Location in Mobile Radio Links," by James J. Spilker, filed Apr. 3, 2001; Ser. No. 60/281,269, "An ATSC Standard DTV Channel For Low Data Rate Broadcast to Mobile Receivers," by James J. Spilker and Matthew Rabinowitz, filed Apr. 3, 2001; Ser. No. 60/293,812, "DTV Monitor System Unit (MSU)," by James J. Spilker and Matthew Rabinowitz, filed May 25, 2001; Ser. No. 60/293,813, "DTV Position Location Range And SNR Performance," by James J. Spilker and Matthew Rabinowitz, filed May 25, 2001; and Ser. No. 60/293,646, "Time-Gated Noncoherent Delay Lock Loop Tracking Of DTV Signals," by James J. Spilker and Matthew Rabinowitz, filed May 25, 2001. The subject matter of all of the foregoing are incorporated herein by reference.

BACKGROUND

The present invention relates generally to position determination, and particularly to position determination using DTV signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the analog TV signal described contains horizontal and vertical synchronization pulses intended only for relatively crude synchronization of the TV set sweep circuitry, and not suitable for precise positioning. Further, in 2006 the Federal Communication Commission (FCC) will consider turning off NTSC transmitters and reassigning that valuable spectrum so that it can be auctioned for other purposes deemed more valuable.

The above disclosures describe the use of the new American Television Standards Committee (ATSC) digital television (DTV) signals for position location. When these techniques are used to determine the position of a handheld unit such as a cellular telephone, the efficient use of the limited power supply of the handheld unit is important.

SUMMARY

In general, in one aspect, the invention features a computer program product, apparatus, and method for use in determining the position of a user terminal. It includes receiving at the user terminal a digital television (DTV) broadcast signal transmitted by a DTV transmitter; tracking a periodic component of the DTV signal using a delay-lock loop (DLL), including selecting an observation interval based on the timing of the periodic component, and turning on a portion of the DLL during the observation interval, and turning the portion off otherwise; and determining a pseudo-range between the user terminal and the DTV transmitter based on the DTV broadcast signal; and wherein the position of the user terminal is determined based on the pseudo-range and a location of the DTV transmitter.

Particular implementations can include one or more of the following features. Implementations include determining the position of the user terminal based on the pseudo-range and the location of the DTV transmitter. Determining a position of the user terminal includes adjusting the pseudo-range based on a difference between a transmitter clock at the DTV transmitter and a known time reference; and determining the position of the user terminal based on the adjusted pseudo-range and the location of the DTV transmitter. The DTV broadcast signal is an American Television Standards Committee (ATSC) DTV signal, and the pseudo-range is determined based on a known digital sequence in the ATSC frame. The known digital sequence is a synchronization code. The synchronization code is a Field Synchronization Segment within an ATSC data frame. The synchronization code is a Synchronization Segment within a Data Segment within an ATSC data frame.

Determining a position of the user terminal includes determining an offset between a local time reference in the user terminal and a master time reference; and determining the position of the user terminal based on the pseudo-range, the location of the DTV transmitter, and the offset. Determining a pseudo-range includes correlating the DTV signal with a signal generated by the user terminal as the DTV signal is received to produce the pseudo-range.

Implementations include tracking the pilot signal of the DTV signal using a phase-lock loop; and wherein tracking the component of the DTV signal is based on the tracking of the pilot signal. Implementations include transmitting the pseudo-range to a location server configured to determine a position of the user terminal based on the pseudo-range and a location of the DTV transmitter. The position of the user terminal is determined by adjusting the pseudorange based on a difference between a transmitter clock at the transmitter of the broadcast analog television signal and a known time reference, and determining the position of the user terminal based on the adjusted pseudorange and the location of the TV transmitter. Implementations include determining a further pseudorange based on a further broadcast analog television signal; and projecting the pseudorange and the further pseudorange to an instant of time, thereby eliminating any first order term in the clock of the user terminal.

Advantages that can be seen in implementations of the invention include one or more of the following. Implementations of the invention may be used to position cellular telephones, wireless PDA's (personal digital assistant), pagers, cars, OCDMA (orthogonal code-division multiple access) transmitters and a host of other devices. Implementations of the inventions make use of a DTV signal which has excellent coverage over the United States, and the existence of which is mandated by the Federal Communication Commission. Implementations of the present invention require no changes to the Digital Broadcast Stations.

The DTV signal has a power advantage over GPS of more than 40 dB, and substantially superior geometry to that which a satellite system could provide, thereby permitting position location even in the presence of blockage and indoors. The DTV signal has roughly six times the bandwidth of GPS, thereby minimizing the effects of multipath. Due to the high power and low duty factor of the DTV signal used for ranging, the processing requirements are minimal. Implementations of the present invention accommodate far cheaper, lower-speed, and lower-power devices than a GPS technique would require.

In contrast to satellite systems such as GPS, the range between the DTV transmitters and the user terminals changes very slowly. Therefore the DTV signal is not significantly affected by Doppler effects. This permits the signal to be integrated for a long period of time, resulting in very efficient signal acquisition.

The frequency of the DTV signal is substantially lower that that of conventional cellular telephone systems, and so has better propagation characteristics. For example, the DTV signal experiences greater diffraction than cellular signals, and so is less affected by hills and has a larger horizon. Also, the signal has better propagations characteristics through buildings and automobiles.

Unlike the terrestrial Angle-of-Arrival/Time-of-Arrival positioning systems for cellular telephones, implementations of the present invention require no change to the hardware of the cellular base station, and can achieve positioning accuracies on the order of 1 meter. When used to position cellular phones, the technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 illustrates the structure of the field synchronization segment.

FIG. 6 illustrates the structure of the data segment.

Figure 1:
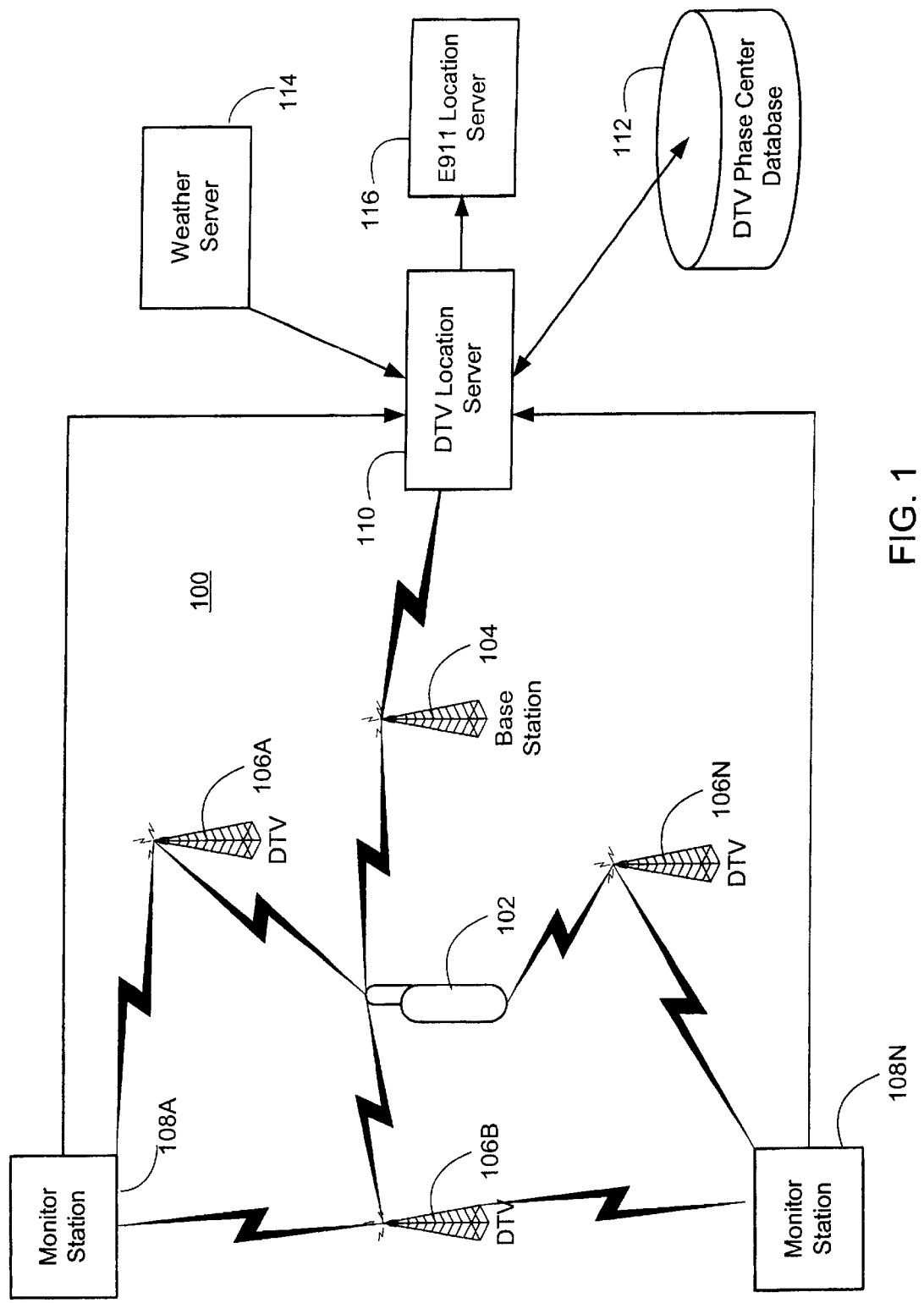
FIG. 1 shows an example implementation that includes a user terminal that communicates over an air link with a base station.

The leading digit(s) of each reference numeral used in this specification indicates the number of the drawing in which the reference numeral first appears.

DETAILED DESCRIPTION

Introduction

Digital television (DTV) is growing in popularity. DTV was first implemented in the United States in 1998. As of the end of 2000, 167 stations were on the air broadcasting the DTV signal. As of Feb. 28, 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States.

These new DTV signals permit multiple standard definition TV signals or even high definition signals to be transmitted in the assigned 6 MHz channel. These new American Television Standards Committee (ATSC) DTV signals are completely different from the analog NTSC TV signals, are transmitted on new 6 MHz frequency channels, and have completely new capabilities.

The inventors have recognized that the ATSC signal can be used for position location, and have developed techniques for doing so. These techniques are usable in the vicinity of ATSC DTV transmitters with a range from the transmitter much wider than the typical DTV reception range. Because of the high power of the DTV signals, these techniques can even be used indoors by handheld receivers, and thus provide a possible solution to the position location needs of the Enhanced 911 (E911) system.

The techniques disclosed herein are also applicable to DTV signals as defined by the Digital Video Broadcasting (DVB) standard recently adopted by the European Telecommunications Standards Institute (ETSI). For example, the techniques described herein can be used with the scattered pilot carrier signals embedded within the DVB signal. The DVB scattered pilot carrier signals are a set of 868 uniformly-spaced pilot carrier signals, each of which is frequency hopped in a chirp-like fashion over four sequentially-increasing frequencies. These techniques are also applicable to DTV signals as defined by the Japanese Integrated Service Digital Broadcasting-Terrestrial (ISDB-T). These techniques are also applicable to other DTV signals, including those which transmit a known sequence of data.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

Certain implementations of the present invention use only the DTV signal synchronization codes as opposed to demodulating and decoding the DTV 8-ary Vestigial Sideband Modulation (8VSB) data signal. Consequently, the DTV signal can be correlated for a period roughly a million times longer than the period of single data symbol. Thus the ability to track signals indoors at substantial range from the DTV tower is greatly expanded. Furthermore, through the use of digital signal processing it is possible to implement these new tracking techniques in a single semiconductor chip.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
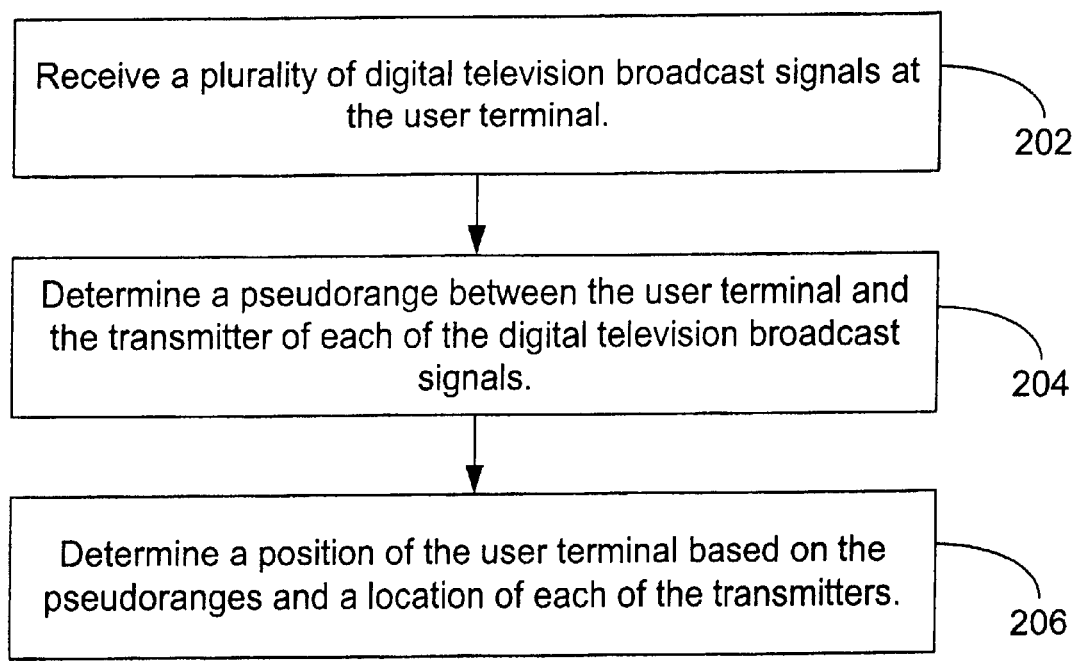
FIG. 2 illustrates an operation of the implementation of FIG. 1.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations. Further details of monitor units 108 are described in a commonly-owned copending patent application entitled "Position Location using Broadcast Digital Television Signals," filed Jun. 21, 2001, Ser. No. 09/887,158, the disclosure thereof incorporated by reference herein in its entirety.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, where the DTV symbol clocks are very stable, each time offset is modeled as a fixed offset. In another implementation each time offset is modeled as a second order polynomial fit of the form $$\text{Offset}=a+b(t-T)+c(t-T)^2 \qquad (1)$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources such as NOAA. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
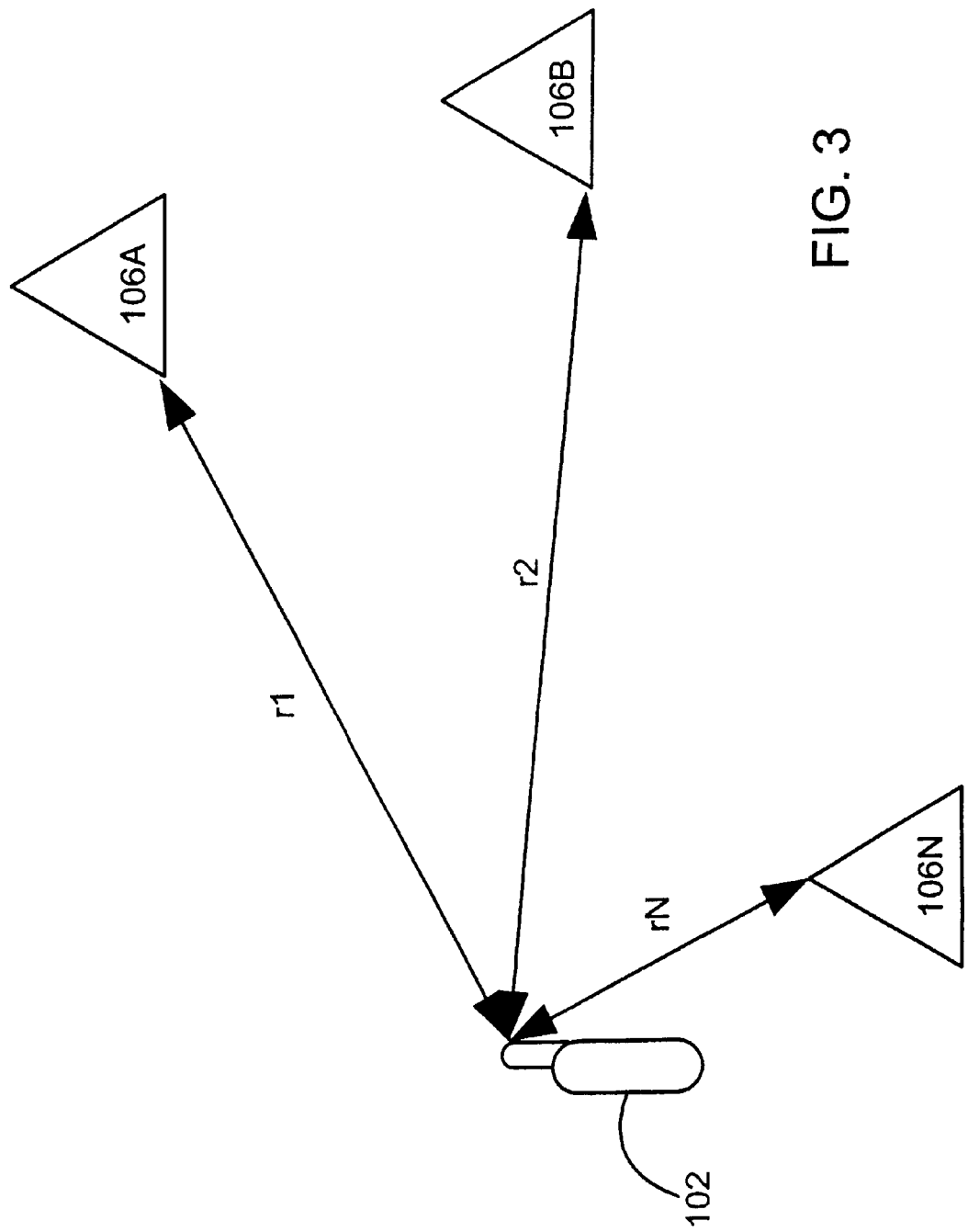
FIG. 3 depicts the geometry of a position determination using three DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (xN, yN). The range between user terminal 102 and DTV transmitter 106N is rN.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

Now a simplified position location process is described, where it is assumed that the clock offset of the user device can be modeled by a single constant offset T. This assumption is true if the user measurements are projected to the same instant of time, or if the user clock is stabilized using a clock reference from the cellular base station or a stable DTV transmitter. User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and prN are given by $$pr1 = r1 + T \quad (2a)$$

$$pr2 = r2 + T \quad (3a)$$

$$prN = rN + T \quad (4a)$$

where we have assumed that the clock offset T is in units of distance. Namely, T represents a timing offset multiplied by the speed of light. The three ranges can be expressed as $$r1 = |X - X1| \quad (5)$$

$$r2 = |X - X2| \quad (6)$$

$$rN = |X - XN| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and XN represents the two-dimensional vector position (xN, yN) of DTV transmitter 106N. These relationships produce three equations in which to solve for the three unknowns x, y, and T.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, $\Delta$, the clock offset, T(t), can be modeled by a constant and a first order term. Namely, $$T(t + \Delta) = T(t) + \frac{\partial T}{\partial t} \Delta \quad (8)$$

We now reconsider equations (2a)–(4a) treating the clock offset as a function of time. Consequently, the pseudorange measurements are also a function of time. For clarity, we assume that the ranges remain essentially constant over the interval $\Delta$. The pseudorange measurements may then be described as:

$$pr1(t1) = r1 + T(t1) \quad (2b)$$

$$pr2(t2) = r2 + T(t2) \quad (3b)$$

$$prN(tN) = rN + T(tN) \quad (4b)$$

In one embodiment, the user terminal 102 commences with an additional set of pseudorange measurements at some time $\Delta$ after the initial set of measurements. These measurements may be described:

$$pr1(t1 + \Delta) = r1 + T(t1) + \frac{\partial T}{\partial t} \Delta \quad (2c)$$

$$pr2(t2 + \Delta) = r2 + T(t2) + \frac{\partial T}{\partial t} \Delta \quad (3c)$$

$$prN(tN + \Delta) = rN + T(tN) + \frac{\partial T}{\partial t} \Delta \quad (4c)$$

The user terminal 102 then projects all the pseudorange measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0) = pr1(t1) + [pr1(t1+\Delta) - pr1(t1)](t0-t1)/\Delta \quad (2d)$$

$$pr2(t0) = pr2(t2) + [pr2(t2+\Delta) - pr2(t2)](t0-t2)/\Delta \quad (3d)$$

$$prN(t0) = prN(tN) + [prN(tN+\Delta) - prN(tN)](t0-tN)/\Delta \quad (4d)$$

These projected pseudorange measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudorange measurements for each projection. Notice also that there are many other approaches to implementing this concept of projecting the pseudorange measurements to the same instant of time. One approach, for example, is to implement a time-gated delay locked loop as described below. A separate tracking loop can be dedicated to each DTV transmitter 106. These tracking loops effectively interpolate between pseudorange measurements. The state of each of these tracking loops is sampled at the same instant of time.

DTV locations server 110 solves the equations for x, y, and T according to conventional well-known methods. In an E911 application, the position of user terminal 102 is transmitted to E911 location server 116 for distribution to the proper authorities. In another application, the position is transmitted to user terminal 102.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114 and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination.

ATSC Signal Description

Figure 4:
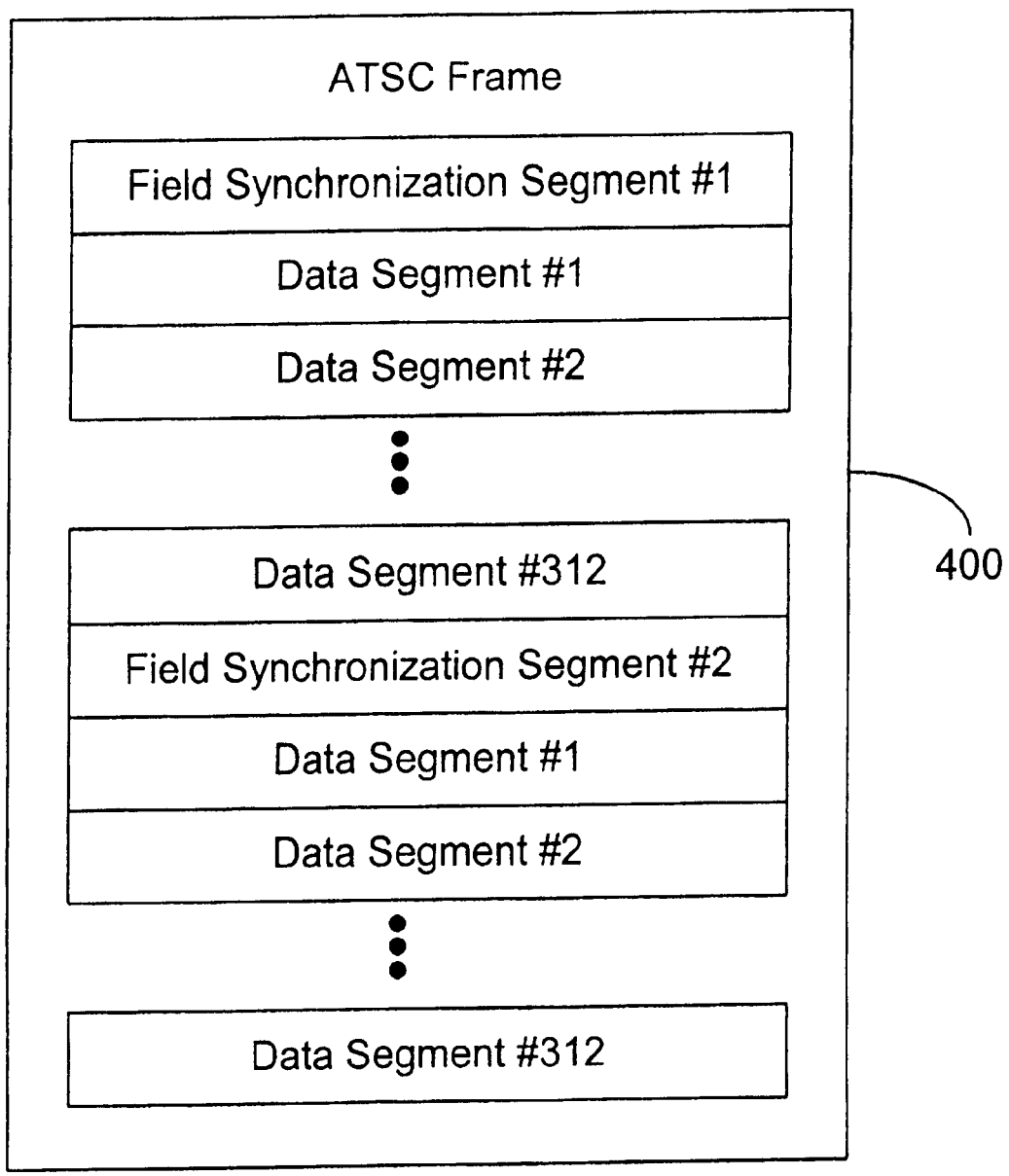
FIG. 4 illustrates the structure of the ATSC frame.

The current ATSC signal is described in "ATSC Digital Television Standard and Amendment No. 1," Mar. 16, 2000, by the Advanced Television Systems Committee. The ATSC signal uses 8-ary Vestigial Sideband Modulation (8VSB). The symbol rate of the ATSC signal is 10.762237 MHz, which is derived from a 27.000000 MHz clock. The structure 400 of the ATSC frame is illustrated in FIG. 4. The frame 400 consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

The structure 500 of the field synchronization segment is illustrated in FIG. 5. The two field synchronization segments 500 in a frame 400 differ only to the extent that the middle set of 63 symbols are inverted in the second field synchronization segment.

The structure 600 of the data segment is illustrated in FIG. 6. The first four symbols of data segment 600 (which are −1, 1, 1, −1) are used for segment synchronization. The other 828 symbols in data segment 600 carry data. Since the modulation scheme is 8VSB, each symbol carries 3 bits of coded data. A rate ⅔ coding scheme is used.

Implementations of the invention can be extended to use future enhancements to DTV signals. For example, the ATSC signal specification allows for a high rate 16VSB signal. However, the 16VSB signal has the same field synch pattern as the 8VSB signal. Therefore, a single implementation of the present invention can be designed to work equally well with both the 8VSB and the 16VSB signal.

Figure 7:
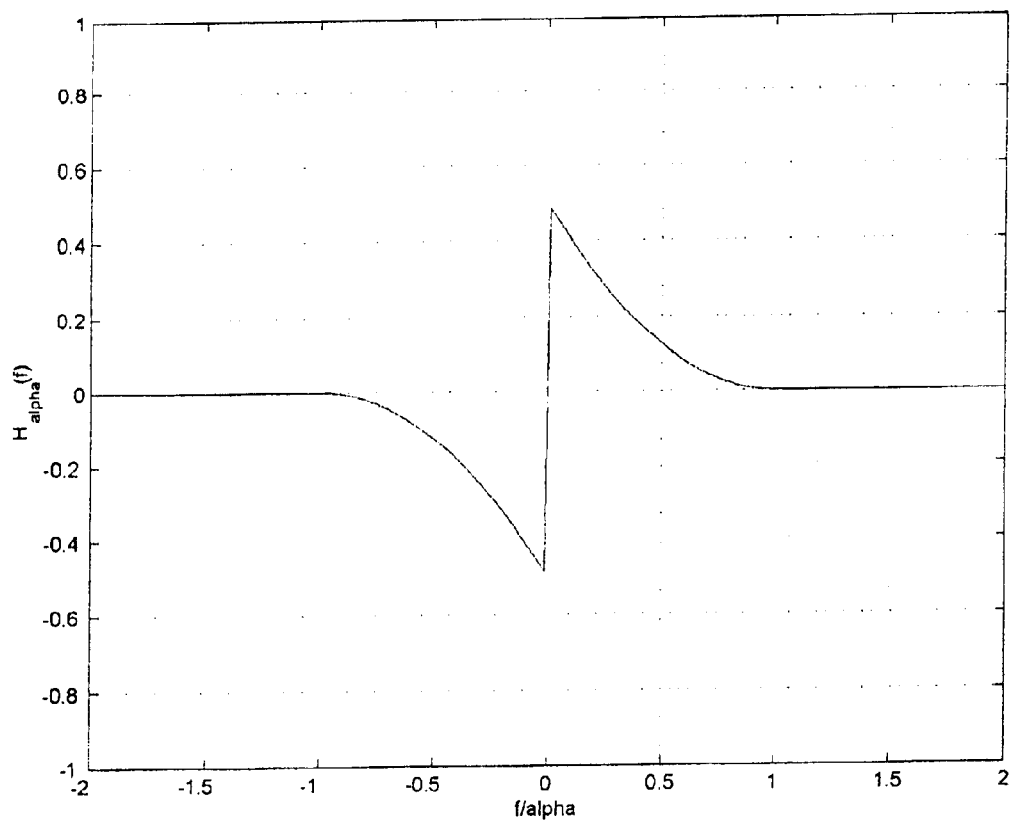
FIG. 7 shows a plot of the gain function for a filter designed to leave a vestigial remainder of the lower sideband.

The 8VSB signal is constructed by filtering. The in-phase segment of the symbol pulse has a raised-cosine characteristic, as described in J. G. Proakis, Digital Communications, McGraw-Hill, $3^{rd}$ edition, 1995. The pulse can be described as $$p(t) = \mathrm{sinc}\left(\frac{\pi t}{T}\right)\frac{\cos\left(\frac{\pi \beta t}{T}\right)}{1 - \frac{4\beta^2 t^2}{T^2}} \quad (9)$$

where T is the symbol period $$T = \frac{1}{10.76 \times 10^6} \quad (10)$$

and β=0.5762. This signal has a frequency characteristic $$P(f) = \begin{cases} T & \left(0 \le |f| \le \dfrac{1-\beta}{2T}\right) \\ \dfrac{T}{2}\left\{1+\cos\left[\dfrac{\pi T}{\beta}\left(|f|-\dfrac{1-\beta}{2T}\right)\right]\right\} & \left(\dfrac{1-\beta}{2T} \le |f| \le \dfrac{1+\beta}{2T}\right) \\ 0 & \left(|f| > \dfrac{1+\beta}{2T}\right) \end{cases} \quad (11)$$

from which it is clear that the one-sided bandwidth of the signal is $(1+\beta)10.762237$ MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \quad (12)$$

where $$U(f) = \begin{cases} 1, f \ge 0 \\ 0, f < 0 \end{cases} \quad (13)$$

where $H_\alpha(f)$ is a filter designed to leave a vestigial remainder of the lower sideband. A plot of the gain function for $H_\beta(f)$ is shown in FIG. 7. The filter satisfies the characteristics $H_\alpha(-f) = -H_\beta(f)$ and $H_\alpha(f)=0$, $f>\alpha$. The response $U(f)P(f)$ can be represented as $$U(f)P(f) = \dfrac{1}{2}(P(f) + j\hat{P}(f)) \quad (14)$$

where $\hat{P}(f) = -j \, \text{sgn}(f)P(f)$ is the Hilbert transform of $P(f)$. The VSB pulse may be represented as $$P_v(f) = \dfrac{1}{2}X(f) + \dfrac{j}{2}(\hat{X}(f) + 2X(f)H_\alpha(f)) \quad (15)$$

and the baseband pulse signal $$p_v(t) = \dfrac{1}{2}x(t) + \dfrac{j}{2}(\hat{x}(t) + x_\alpha(t)) = p_{vi}(t) + jp_{vq}(t) \quad (16)$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi f t}df \quad (17)$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \quad (18)$$

where $C_n$ is the 8-level data signal.

The ATSC DTV signal is useful for position location services with cellular handsets, wireless PDAs, and the like as described in a commonly-owned copending patent application entitled "Position Location using Broadcast Digital Television Signals," filed Jun. 21, 2001, Ser. No. 09/887,158, the disclosure thereof incorporated by reference herein in its entirety.

The ATSC DTV signal includes three important components that are valuable for use in position location: the ATSC pilot signal, segment synchronization signal, and the field synchronization signal.

The ATSC pilot signal is a pure carrier with no data modulation, approximately 11 dB below the data modulation signal. Relative to the binary +/−5 amplitude synchronization signal, this pure carrier has an amplitude 1.25 or an amplitude ratio of 4 or −12.04 dB. Because the synchronization signals have a relatively low duty factor of approximately 0.0080 or −20.96 dB, the pilot signal is approximately 8.93 dB stronger than the synchronization signals.

The pilot signal alone is not a critical element in the receiver; however the pilot signal carries valuable information for a noncoherent synchronization signal tracking receiver using a time-gated delay lock loop. Thus the pilot signal permits the use of very narrow-band tracking filters despite the uncertainties of relatively low-cost cell phone handset crystal oscillators. In addition to removing the frequency offsets of the transmitter and handset oscillators, the pilot signal also removes the Doppler effects of user motion.

To obtain comparable integration times, a GPS receiver requires substantial aiding to remove the +/−5 kHz Doppler caused by satellite motion; the effects of handset clock error must be removed by other means. Further, there is no known method for cleanly eliminating the effects on GPS of user motion in a car which can generate a Doppler on the order of at least 160 Hz. The ATSC signal on the other hand has a pure unmodulated pilot signal.

Each segment of 832 symbols in the ATSC signal begins with the segment synchronization signal, a fixed 4-symbol pattern which repeats approximately every 77.32 microseconds. This segment synchronization signal, as well as the field synchronization signal, has a 10.76 mega-samples per second (Msps) symbol rate and a 6 MHz bandwidth, thus permitting a higher accuracy pulse resolution than available with the GPS C/A code with its 1.023 Msps chip rate. This segment synchronization signal is useful not only by itself but also as a acquisition aid to the more multipath resistant field synchronization signal.

Each field of 313 segments begins with a field synchronization signal, a relatively fixed symbol pattern of 832 symbols. The field synchronization signal includes several pseudo-noise (PN) sequences including a 511-chip sequence and a 63-chip PN sequence repeated several times. Because this sequence is largely random-like, it provides a more narrow noncoherent autocorrelation function than that of the segment synchronization signal by a factor of approximately 2.

Although the ATSC signal is coherently demodulated for reception of digital TV, and makes use of both the pilot signal and the field synchronization signal as a training sequence, the tracking receivers disclosed herein preferably utilize a noncoherent approach. The noncoherent approach is superior for two reasons.

First, the noncoherent approach permits the tracking receivers to operate at a much lower signal-to-noise ratio than coherent receivers, perhaps 40 or 50 dB below normal operating digital TV reception levels. Second, the pilot signal is assumed to be offset in phase by multipath. Thus even though the pilot signal gives an excellent frequency reference, multipath signals can offset the recovered phase significantly. Although digital TV receivers must cope with the same effect, they are operating at a much higher SNR and can demodulate the field synchronization symbols as a training sequence and thereby correct for the multipath in an equalizer.

The following description assumes a receiver timeline that begins with pilot signal recovery, followed by segment synchronization, and concluding with field synchronization processing. However, this processing can be implemented in several alternative methods including processing of stored recorded digital data or processing digital sampled data in real time.

Pilot Signal Recovery

The pilot signal is located approximately 310 kHz above the lower edge of the 6 MHz DTV channels. The pilot signal includes no data modulation; it is a pure carrier, thus providing an excellent means for recovery.

Figure 8:
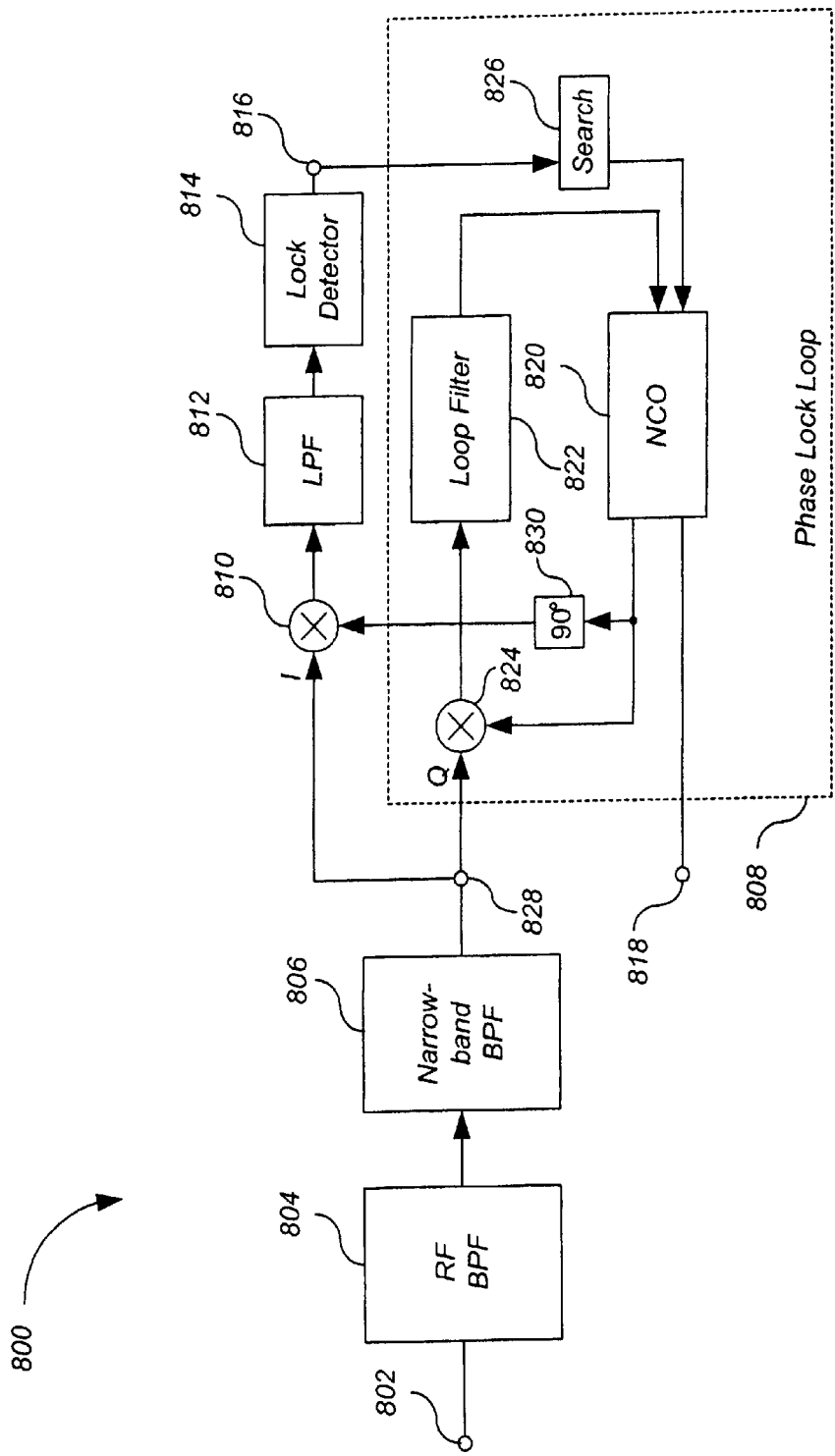
FIG. 8 shows a pilot signal recovery and lock detector for recovering the pilot signal according to one implementation.

FIG. 8 shows a pilot signal recovery and lock detector 800 for recovering the pilot signal according to one implementation. Although detector 800 is described in an IF configuration, it will be apparent to one skilled in the relevant arts after reading this description that one could implement these functions in either baseband in phase/quadrature (I/Q) formats, and of course either can be implemented in digital sampled data formats.

The received DTV signal is applied to a terminal 802 of a 6 MHz bandpass filter 804 that selects the proper DTV channel for processing. The selected DTV channel is applied to a narrow-band filter 806 of sufficient bandwidth to pass the pilot signal, accommodating the frequency uncertainties of the handset local oscillator and DTV transmitter, and any Doppler shift caused by motion of the user terminal. The pilot signal is located approximately 310 kHz above the bottom of the 6 MHz channel. I and Q components of the pilot signal are thus available at terminal 828.

The pilot signal is tracked by a phase lock loop (PLL) 808 of conventional design. If the closed-loop bandwidth of PLL 808 is 6 Hz then the processing gain against the 6 MHz wide band noise is 60 dB. A lock detector 814 asserts a lock signal at terminal 816 when detector 800 is locked onto the pilot signal. When the lock signal is asserted, the pilot signal is available at terminal 818. Within PLL 808, a search controller 826 drives a number controlled oscillator (NCO) 820 to search until the lock signal is asserted. The output of NCO 820 is mixed with the Q component of the pilot signal by mixer 824. The result is processed by loop filter 822 and then passed to NCO 820.

The output of NCO 820 is shifted by 90 degrees by phase shifter 830. Mixer 810 combines the shifted signal with the I component of the pilot signal. The result is filtered by low-pass filter (LPF) 812 to produce a magnitude representing the degree of lock. When the magnitude exceeds a predetermined threshold, lock detector 814 asserts the lock signal at terminal 816.

Segment Synchronization Signal Tracking

Figure 9:
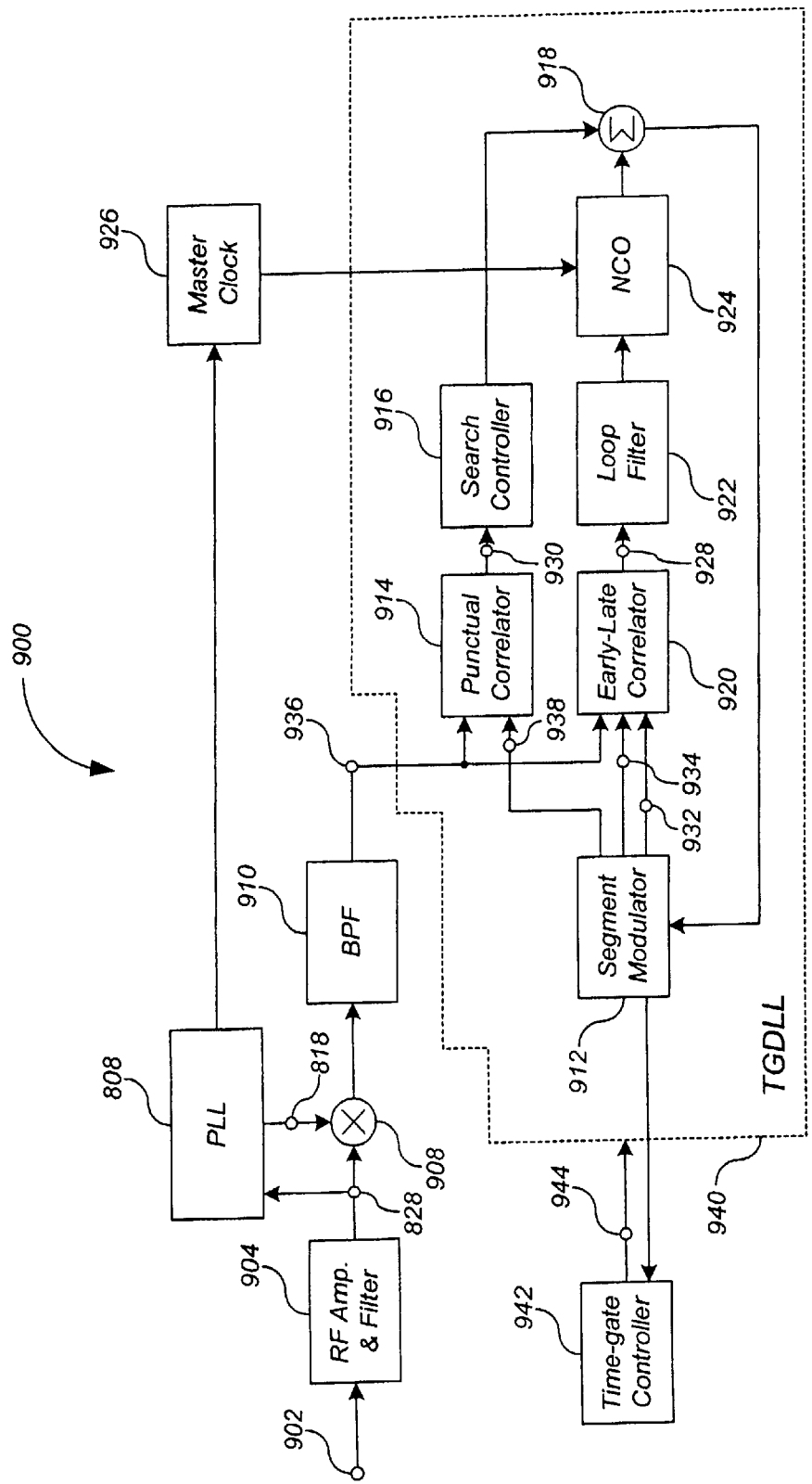
FIG. 9 shows a receiver including a time-gated delay lock loop for tracking the segment synchronization signal according to one implementation.

FIG. 9 shows a receiver 900 including a time-gated delay lock loop (TGDLL) 940 for tracking the segment synchronization signal according to one implementation. Delay lock loops are well-known in the relevant arts. Implementations of the present invention employ delay lock loop tracking techniques using delay lock loops such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein.

Receiver 900 includes a PLL 808 that tracks the pilot signal as described above with reference to FIG. 8, thereby greatly reducing the frequency uncertainty of the de-spread carrier and permitting longer integration times in the noncoherent TGDLL. PLL 808 also provides a reference signal that is based on the pilot signal frequency to a master clock 926, which provides timing correction signals to NCO 924. In other implementations, timing correction is performed later, during signal processing.

TGDLL 940 contains early, late and punctual channels. The early-late channel time separation can be set at less than the width of the segment synchronization noncoherent correlation peak to reduce multipath effects. The punctual channel is used for lock detection. All three channels are separate channels that can be used for reduction of the search/acquisition time. Multiple punctual channels can be used to reduce the search/acquisition time by an order of magnitude. Segment modulator 912 thus produces three versions of the segment synchronization signal: a punctual signal at terminal 938, an early signal at terminal 934, and a late signal at terminal 932. The early and late signals differ from the punctual signal by some predetermined offset, for example half a symbol time.

Time-gate controller 942 generates a time-gate signal at terminal 944 that turns the memoryless elements of TGDLL 940 on and off to conserve power, such that these elements are operational and producing signals only when those signals are needed. Time-gate controller 942 is controlled by timing signals generated by segment modulator 912 based on the timing of the code it produces. Elements in the front end of the receiver (not shown) can be time-gated as well. This saves substantial power, making implementations especially suitable for portable devices having limited power resources.

The noncoherent processing gain is governed in part by the IF filter bandwidth. With the pilot signal recovery operating above threshold, the IF bandwidth can be substantially less than the input bandwidth. Post-detection processing can integrate over 1 second or even more.

The RF DTV signal is fed to terminal 902. The signal is amplified and filtered by a conventional RF amplifier and filter 904. The resulting signal is provided to PLL 808 at terminal 828. PLL 808 provides the recovered pilot signal at terminal 818. Mixer 908 combines the two signals. After filtering by band-pass filter 910, the resulting filtered pilot signal is available at terminal 936.

Filtered pilot signal 936 is fed to a punctual correlator 914 and an early-late correlator 920. Early-late correlator 920 produces an early-late correlation result at terminal 928, as described below with respect to FIG. 10. The early-late correlation result is filtered by loop filter 922 that drives a NCO 924, producing an integration result.

Punctual correlator 914 produces a punctual correlation result at terminal 930, as described below with respect to FIG. 11. The punctual correlation result drives a search controller 916 that produces a search signal. The integration result and search signal are combined by mixer 918 to drive segment modulator 912 to step by some increment, for example half a symbol time. When the correlation peak is found, the time offset that produced the correlation is used as the pseudo-range for the received DTV signal.

Early-Late Correlator Detail

We will now describe one embodiment of the early-late correlator for the segment synchronization. The segment synchronization signal fed to PLL 808 at terminal 828 can be represented as $$h(t)\cos(\omega t+\phi)-h'(t)\sin(\omega t+\phi) \qquad (19)$$

where h'(t) is the Hilbert transform of h(t). Signal h(t) is the in-phase component of the segment synchronization signal, and signal h'(t) is the quadrature component of the segment synchronization signal. For simplicity, we ignore the modulation caused by the actual DTV data signal, which has negligible impact on the output of the correlator. The signal produced by PLL 808 at terminal 818 can be represented as $$\cos(\omega t - \Delta t) \quad (20)$$

where $\Delta$ is some frequency offset. Although the PLL 808, as described above, recovers the carrier frequency, $\omega$, we assume for the sake of generality in the following description that the signal at terminal 818 has some frequency offset. This could occur because the PLL 808 is designed to output a mixing signal which is offset some frequency $\Delta$ from the carrier. Frequency offset $\Delta$ could also represent some error in the carrier recovery. One skilled in the art will recognize that if $\Delta$ is approximately 0, subsequent filtering may be implemented at base-band, rather than at IF as described below. Because the non-coherent detector can handle a frequency offset $\Delta$, one skilled in the art will also recognize that PLL 808 is not necessary in all embodiments of the invention. For example, when user terminal 102 is informed of the carrier frequency, $\omega$, of the relevant DTV channels by the monitor unit 108, then carrier recovery is not necessary.

These signals at terminals 818 and 828 are combined by mixer 908 and filtered by BPF 910 to produce the filtered signal at terminal 936 that can be represented as $$h(t)\cos(\Delta t + \phi) - h'(t)\sin(\Delta t + \phi) \quad (21)$$

Figure 10:
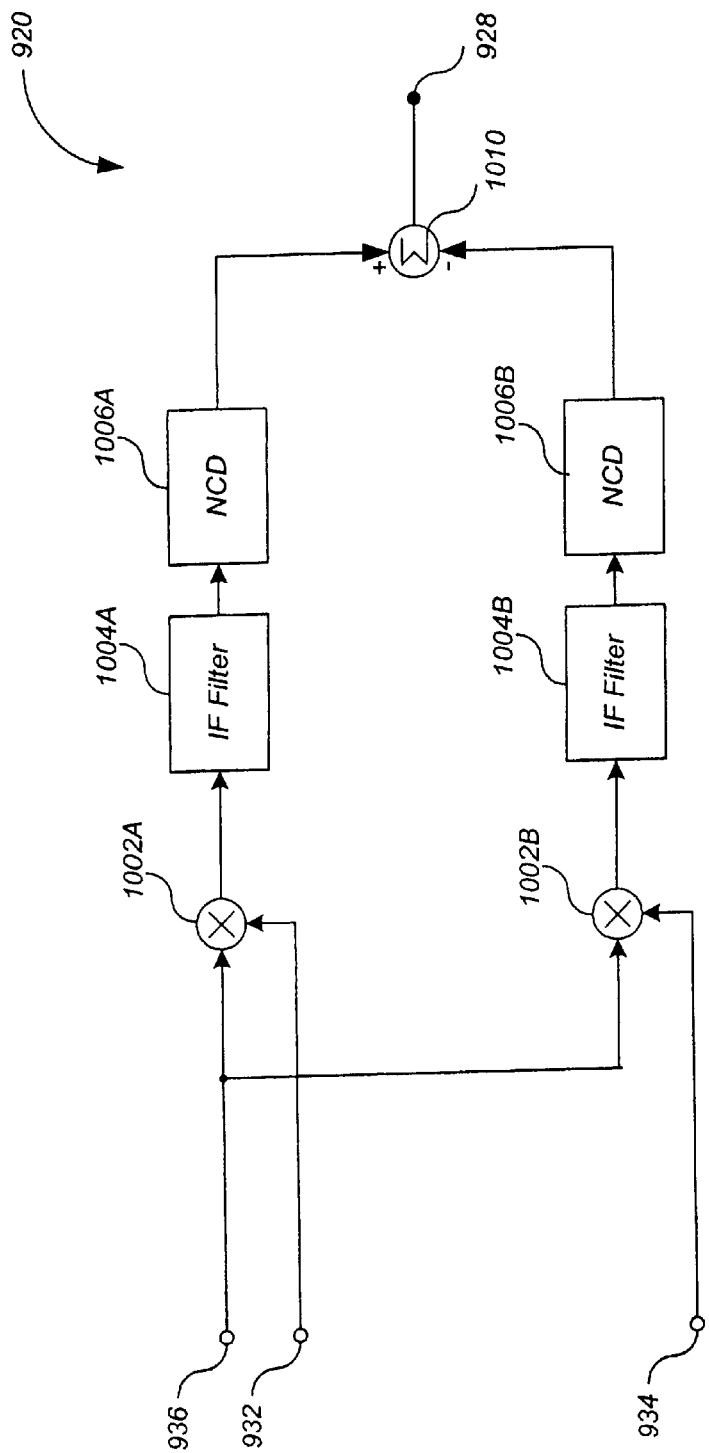
FIG. 10 shows detail of an early-late correlator according to one implementation.

FIG. 10 shows detail of early-late correlator 920. Segment modulator 912 produces early and late versions of the segment synchronization signal. The late signal can be represented in complex form by $$h(t+\tau-\delta) + jh'(t+\tau-\delta) \quad (22)$$

where $\tau$ represents the offset of the reference code signal relative to the incident code signal, and is varied in order to acquire lock on the incident signal. The symbol $\delta$ represents the delay on the reference code signal for the late correlator and is constant. The in-phase late signal is combined with the filtered signal by mixer 1002A. The result, after filtering by IF filter 1004A, represented as $$R_h(\tau-\delta)\cos(vt+\phi) - R_{hh'}(\tau-\delta)\sin(vt+\phi) + jR_{hh'}(\tau-\delta)\cos(vt+\phi) + jR_h(\tau-\delta)\sin(vt+\phi) \quad (23)$$

where R represents the respective correlation functions, and we have used the relationship between the auto-correlation functions $R_{h'} = -R_h$.

An NCD 1006A determines the square of the absolute magnitude of the incident signal, by squaring and summing the real and imaginary components. This simplifies to $$R_h(\tau-\delta)^2 + R_{hh'}(\tau-\delta)^2 \quad (24)$$

The early section of early-late correlator 920 functions in a similar manner to produce the early correlation result. The in-phase early signal, represented by $$h(t+\tau+\delta) + jh'(t+\tau+\delta) \quad (25)$$

is combined with the filtered signal by mixer 1002B. The result, after filtering by IF filter 1004B, is the early correlation.

An NCD 1006B determines the square of the absolute magnitude of the incident signal, to produce $$R_h(\tau+\delta)^2 + R_{hh'}(\tau+\delta)^2 \quad (26)$$

Summer 1010 presents the difference between the early and late correlation results at terminal 928 as the early-late correlation result.

Figure 11:
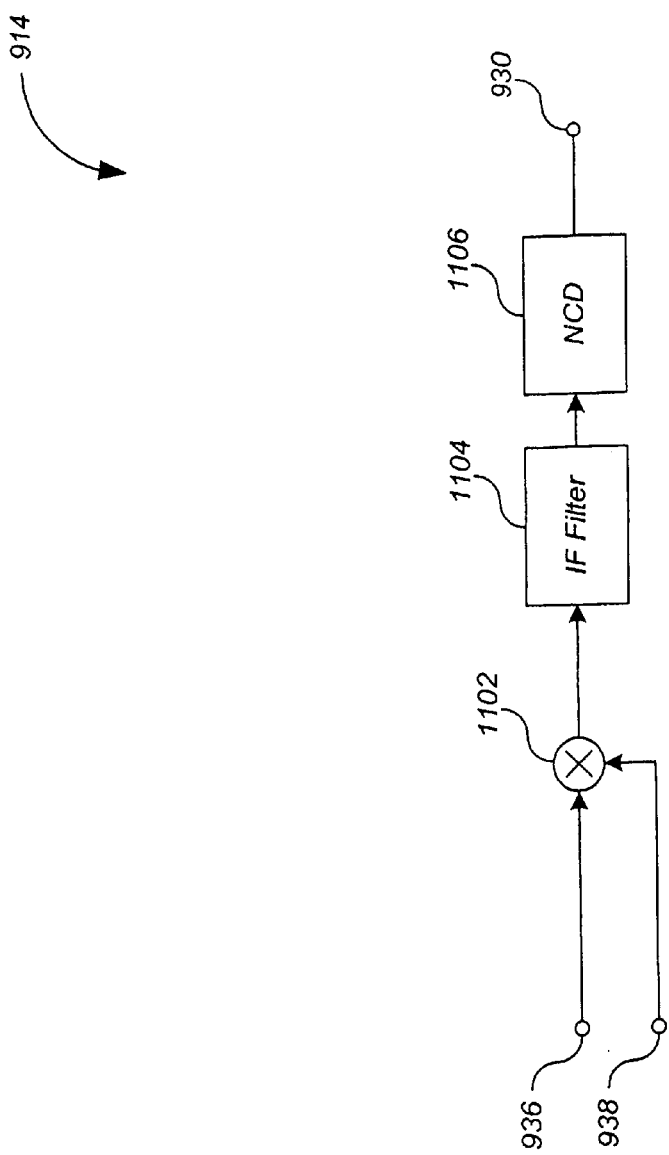
FIG. 11 shows detail of a punctual correlator according to one implementation.

FIG. 11 shows detail of punctual correlator 914. The filtered pilot signal is available at terminal 936. The punctual signal is available at terminal 938, and is combined with the filtered signal by mixer 1102. The result, after filtering by IF filter 1104, drives a NCD 1106. The output of NCD 1106 at terminal 930 is the punctual correlation result.

Field Synchronization Signal Tracking

Figure 12:
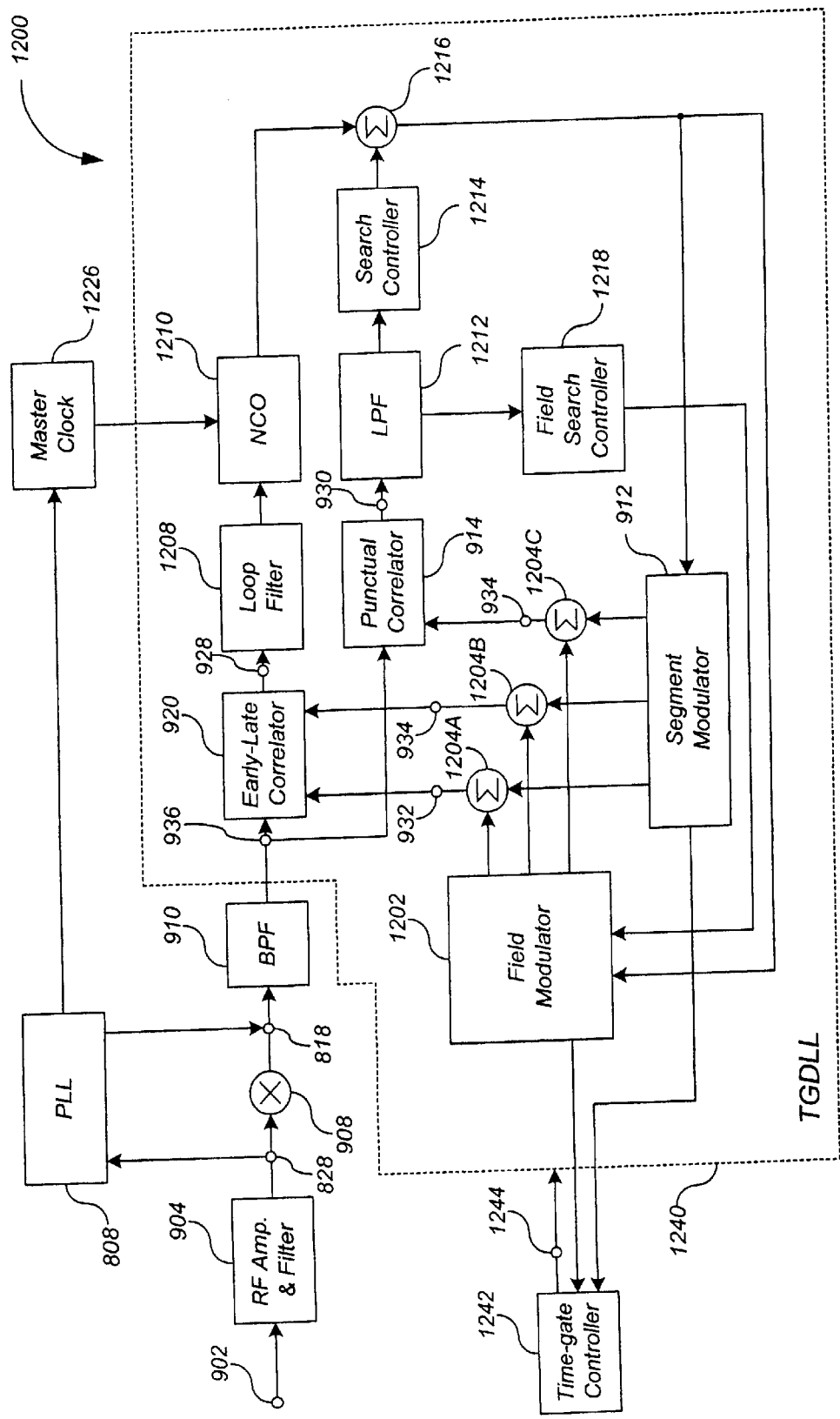
FIG. 12 shows a receiver including a time-gated delay lock loop for tracking the field synchronization signal according to one implementation.

FIG. 12 shows a receiver 1200 including a time-gated delay lock loop (TGDLL) 1240 for tracking the field synchronization signal according to one implementation. TGDLL 1240 can begin operation by tracking the pilot signal, switch to tracking the segment synchronization signal, and then complete with tracking the field synchronization signal alone or in combination with the segment synchronization signal. This process begins with the pilot signal recovery, then searches for, acquires and tracks the segment synchronization signal. The process then searches over the 313 data segments to find which one contains the field synchronization signal. Thus the total number of symbols to be searched is the sum of 832+313 rather than the product of 832×313=260,416; thus acquisition is greatly accelerated. Finally the process switches the tracking operation to the field synchronization signal waveform. Other operations that can be performed by receiver 1200 include the following. Receiver 1200 can acquire and/or track using the field synchronization signal alone, the segment synchronization signal alone, or the field synchronization and segment synchronization signals together. In any of these modes, PLL 808 can be used to reduce acquisition time.

PLL 808 tracks the pilot signal as described above with reference to FIG. 8, thereby greatly reducing the frequency uncertainty of the de-spread carrier and permitting longer integration times in the noncoherent time-gated DLL. PLL 808 also provides a reference signal that is based on the pilot signal frequency to a master clock 1226, which provides timing correction signals to NCO 1210. In other implementations, timing correction is performed later, during signal processing.

TGDLL 1240 contains early, late and punctual channels. The early-late channel time separation can be set at less than the width of the segment synchronization noncoherent correlation peak to reduce multipath effects. The punctual channel is used for lock detection. All three channels are separate channels that can be used for reduction of the search/acquisition time. Multiple punctual channels can be used to reduce the search/acquisition time by an order of magnitude. Segment modulator 912 thus produces three versions of the segment synchronization signal: a punctual segment synchronization signal, an early segment synchronization, and a late segment synchronization. Similarly, field modulator 1202 produces three versions of the field synchronization signal: a punctual field synchronization signal, an early field synchronization signal, and a late field synchronization signal. The early and late signals differ from the punctual signal by some predetermined offset, for example half a symbol time.

The late signals are added by a summer 1204A and provided to early-late correlator 920. The early signals are added by a summer 1204B and also provided to early-late correlator 920. The punctual signals are added by summer 1204C and provided to punctual correlator 914.

Time-gate controller 1242 generates a time-gate signal at terminal 1244 that turns the memoryless elements of TGDLL 1240 on and off to conserve power, such that these elements are operational and producing signals only when those signals are needed. Time-gate controller 1242 is controlled by timing signals generated by segment modulator 912 and/or field modulator 1202 based on the timing of the codes they produce. Elements in the front end of the receiver (not shown) can be time-gated as well. This saves substantial power, making implementations especially suitable for portable devices having limited power resources.

The RF DTV signal is fed to terminal 902. The signal is amplified and filtered by a conventional RF amplifier and filter 904. The resulting signal is provided to PLL 808 at terminal 828. PLL 808 provides the recovered pilot signal at terminal 818. Mixer 908 combines the two signals. After filtering by band-pass filter 910, the resulting filtered pilot signal is available at terminal 936.

The filtered pilot signal is fed to punctual correlator 914 and early-late correlator 920, described above with respect to FIGS. 11 and 10, respectively. Early-late correlator 920 produces an early-late correlation result at terminal 928, as described above with respect to FIG. 10. The early-late correlation result is filtered by a loop filter 1208 that drives NCO 1210, producing an integration result.

Punctual correlator 914 produces a punctual correlation result at terminal 930, as described above with respect to FIG. 11. The punctual correlation result, filtered by low-pass filter (LPF) 1212, drives search controller 1214 and field search controller 1218. Search controller 1214 produces a search signal that directs a search for the segment synchronization signal. The integration result and search signal are combined by mixer 1216 to drive segment modulator 912 and/or field modulator 1202 to step by some increment, for example half a symbol time. Field search controller 1218 produces a field search signal that directs a search for the field synchronization signal. When the appropriate correlation peak is found, the time offset that produced the correlation is used as the pseudo-range for the received DTV signal.

The advantage of tracking the field synchronization waveform instead of the segment synchronization is two-fold. First, the field synchronization autocorrelation pulse for noncoherent operation is half the width of that for the segment synchronization. Thus it is less sensitive to multipath, and has better accuracy by at least a factor of two. Second, there is a significant 24.2 ms interval between successive observations, thus permitting one to sequence over multiple DTV channels within one 24.2 ms field using only one receiver.

The TGDLL shown in FIG. 12 permits all of these three operations, pilot signal recovery, segment synchronization, and field synchronization in both search and tracking modes to be implemented with the same system.

The minimum bandwidth of the IF filter, as before, is governed by the frequency accuracy of the pilot signal recovery. However, a single field synchronization signal is only 77.3 microseconds long. Thus unless one chooses to coherently integrate over multiple fields, the IF bandwidth is rather short and can easily tolerate frequency offsets of 12.9/4=3.2 kHz if field synchronization only is used.

Post-detection integration can integrate over a longer period to provide a closed loop bandwidth of 1 Hz, for example. The DLL loop automatically tracks the symbol rate of the received signal including the Doppler-induced effects of user terminal motion; for example, the user terminal might be in a moving automobile.

In particular implementations punctual correlator 914 uses as many as 10 to 100 or more parallel correlators to reduce the search and acquisition time. Parallel correlators are commonly used in military GPS receivers. Implementations of the present invention employ similar modes of operation at minor cost in complexity. Further, each of the receiver implementations is easily implemented using digital signal processing on an ASIC chip and sampled, quantized received signals.

Both the segment and field synchronization TGDLLs can operate continuously in time. The field synchronization signal is especially useful because it can operate at a 1/313=0.32% duty factor with a significant time interval between bursts. As discussed below, this sequencing operation permits one to operate sequentially over several DTV signals in a short time sequence.

Notice that even when 4 DTV channels are being tracked with one time-gated receiver, the total duty factor is only 4/313=1.28%. This permits operation in a power-efficient mode wherein much of the receiver can be powered down for almost 99% of the time. Furthermore much of the circuitry can be time-shared and only the filtered results need be stored, for example in multiplexed filter buffers.

Thus the use of the disclosed time-gated delay lock loop receivers presents several key performance advantages. First, all three or more DTV channels can be measured in a single 24.2 ms time interval. Even at 60 mph, the distance traveled by a user terminal in 24.2 ms is only 0.0242×88 ft/s=2.12 ft. Thus there is negligible movement of the user terminal in that period and even that small distance can be compensated.

Second, time-gating of the receiver so that it need operate only 1% of the time can reduce total power consumption by two orders of magnitude.

Third, continuous tracking of the user motion is extremely advantageous if the user is moving in and out of buildings or regions blocked by hills or buildings. Once the receiver has locked on to the DTV signals it can track the signal through even highly-degraded propagation regions.

Fourth, continuous tracking of low dynamic user motion permits the use of very low delay lock loop tracking closed-loop bandwidths. The motion of a user terminal at automobile or walking speeds includes very small acceleration as compared to a jet fighter, for example. Tracking bandwidths of less than 1 Hz are realistic.

As described above, the ATSC DTV signal has an embedded field synchronization signal of duration approximately 77.3 microseconds and period approximately 24.2 ms. Thus it has a duty factor of approximately 1/313=0.319%. Each of the separate DTV transmitters is generally unsynchronized with respect to its field synchronization signal. There are possible exceptions where DTV digital repeaters are used. In this case one or more repeaters may be modulated by time offset versions of the same signal as the master DTV transmitter tower. Thus if one simply takes a sample of each DTV signal of duration 24.2 ms×n, we are guaranteed n observations of the field synchronization signal but 99.7% of that signal sample will be useless for purposes of our signal processing.

One implementation initializes a delay lock loop using a synchronization search technique and thereafter tracks the signal using the time gated delay lock loop tracking techniques as described below. The signals from various DTV transmitters are usually not coincident in time because of their random phasing. Therefore implementations of the present invention time-gate the delay lock loop not only by timing it off when no signal is present but also by changing the frequency channel to another of the desired 3 or more DTV signals needed for horizontal position tracking.

For example, three non-overlapping DTV signals, each of duty factor 0.319%, can be tracked with a total duty factor of only 0.957%. A guard space is implemented around each 77.3 microsecond observation interval for a settling time of perhaps 1–2 microseconds on either side of the useful signal interval. In a very power-sensitive environment, such as in a mobile handset operation, this time gating permits us to turn off much of the electronics during gaps in operation and utilize those elements only a small fraction of the time.

In implementations involving slowly moving handsets, one or more 24.2 ms time intervals can be skipped while still maintain sufficient signal processing gain by virtue of using a very low delay lock loop closed-loop bandwidth.

Figure 13:
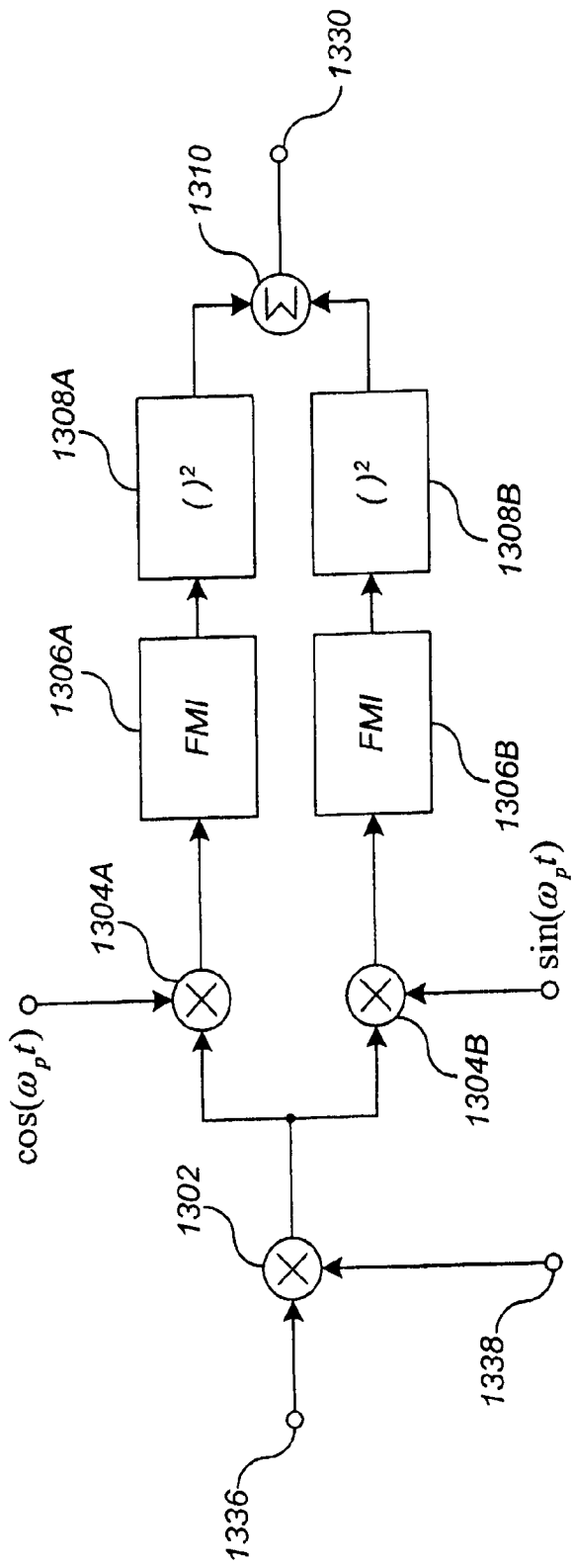
FIG. 13 shows a digital implementation of a punctual correlator.

In an alternative implementation, the receivers discussed above are implemented in digital form. In these implementations, the filtered pilot signal at terminal 936 is further filtered by an IF filter operating in the 6 MHz range. The resulting signal is sampled, for example using an analog-to-digital converter. In one implementation, the sampling rate is 27 MHz, although other sampling rates can be used. The samples are passed to early-late and punctual correlators that are implemented in digital form. One digital implementation of a punctual correlator is shown in FIG. 13. A similar digital implementation of an early-late correlator will be apparent to one skilled in the relevant art after reading this description.

Referring to FIG. 13, the digital samples (available at terminal 1336) are mixed with the signals generated by the segment and/or field modulators (available at terminal 1338) by a mixer 1302. The resulting signal is fed to two mixers 1304A and 1304B. Mixer 1304A combines the signal with $\cos(\omega_p t)$ where the pilot signal has a frequency $\omega_p$ and is offset by some unknown phase. Mixer 1304B combines the signal with $\sin(\omega_p t)$. The outputs of mixers 1304A and 1304B are fed to integrators such as finite memory integrators (FMI) 1306A and 1306B, respectively. The resulting signals are fed to square law detectors 1308A and 1308B, respectively. The resulting signals are summed by summer 1310, and are available at terminal 1330.

Simultaneous Time-Gated DLL Tracking of Multiple ATSC DTV Signals

Figure 14:
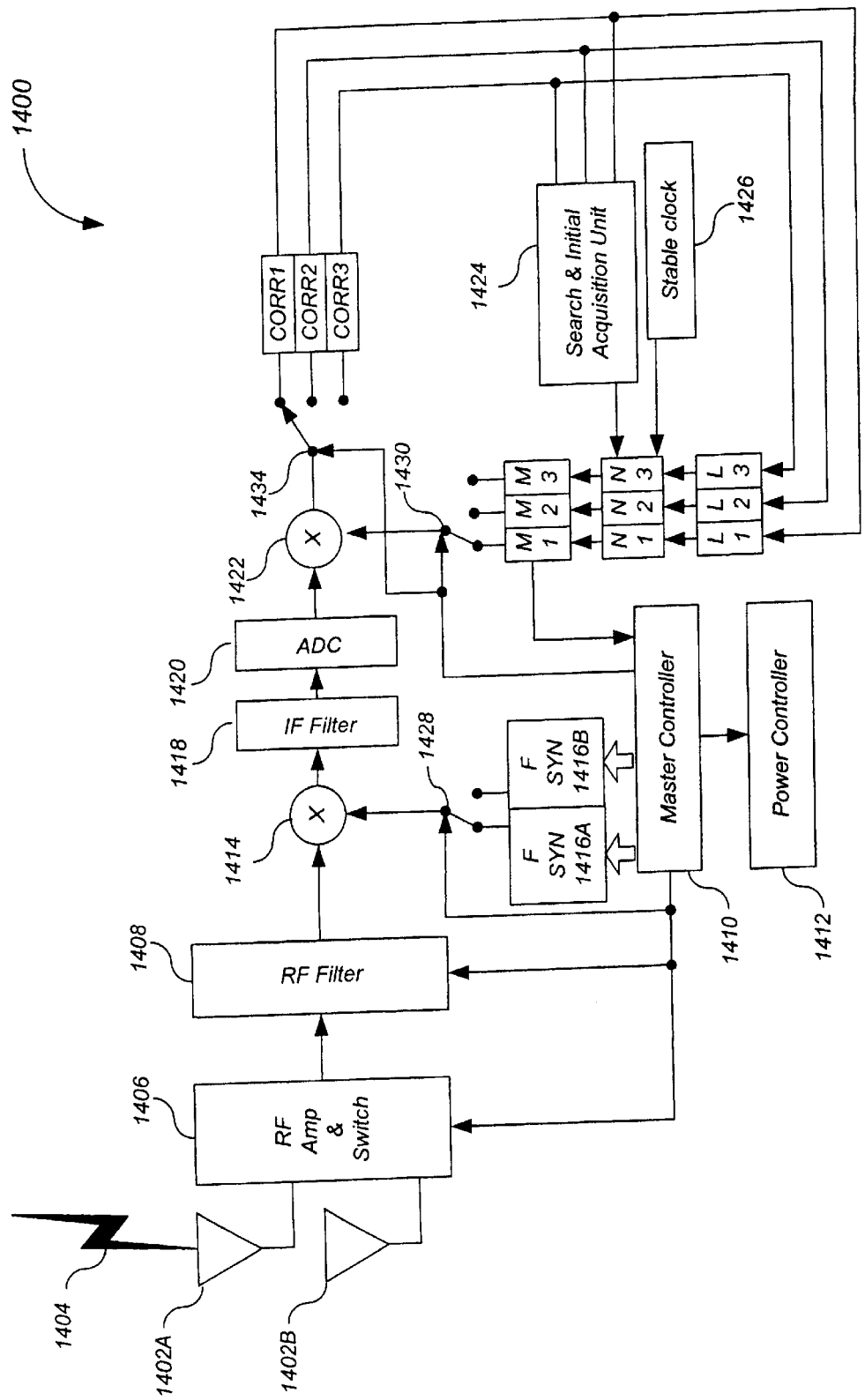
FIG. 14 shows a receiver employing a time-gated delay lock loop tracking multiple ATSC DTV signals simultaneously according to one implementation.

FIG. 14 shows a receiver 1400 employing a time-gated delay lock loop (TGDLL) tracking multiple ATSC DTV signals simultaneously according to one implementation. Although reference is made to I-Q signals representing the IF signal in the following description, it should be understood that these signals are in digital format.

Antennas 1402A and 1402B, preferably a pair of diversity antennas, receive one or more DTV signals 1404. Because receiver 1400 is often implemented within a handset, the orientation of antennas 1402 with respect to the DTV signal transmitters can change with time. For example, a small loop antenna has an antenna pattern that has a $(\sin[p])^2$ type of antenna pattern. Thus in order to avoid a null in the antenna pattern, or a polarization orthogonal to the horizontal polarization of the DTV signal, it is useful to implement antennas 1402 as diversity antennas. In other implementations antenna 1402 is implemented as a single antenna.

RF amplifier and switch 1406 selects the DTV signals from the proper diversity antenna 1402 and RF amplifies the selected signals. RF filter 1408 then filters the amplified signals to pass the DTV signals in a limited bandwidth, for example 470–746 MHz. For example, the DTV field synchronization signal for one DTV channel has a duration of approximately 77.3 microseconds. Adding a settling time for various filters of 1 microsecond or slightly more on either side of the field synchronization signal produces a total observation interval on the order of 80 microseconds for each DTV signal in each 24.2 ms interval. Tracking 3 DTV signals then requires a total observation time of only 3×80 microseconds or 0.24 ms out of the 24.2 ms interval.

Master controller 1410 selects one of the DTV signals for a limited observation time. One of frequency synthesizers 1416A and 1416B generates a signal having the same frequency as the center frequency of the selected DTV channel. This signal is combined with the selected DTV signal by combiner 1414 to tune to the selected DTV signal.

The tuned DTV signal is then passed through an IF bandpass filter 1418 of bandwidth approximately 6 MHz. In one implementation, filter 1418 is a sharp cutoff surface acoustic wave (SAW) filter at an IF frequency in the range of 300–400 MHz. However many other IF frequency selections are possible as well, as would be apparent to one skilled in the relevant art. In an implementation well-suited to complete implementation in a semiconductor chip, direct down-conversion to baseband I and Q channels is employed.

Analog-to-digital converter (ADC) 1420 produces I and Q digital samples at a rate consistent with the 6 MHz bandwidth. These samples are taken only during the observation intervals for each DTV signal. The samples are then processed in a set of I and Q correlators 1422 which can be implemented in one form as binary multipliers. In the implementation discussed below, correlators 1422 are non-coherent correlators. In other implementations, correlators 1422 are coherent correlators. In another implementation, a correlated on-time reference code is used to generate a reference carrier for quasi-coherent correlation.

Signal and noise are passed into correlator 1422 only during the observation interval. Master controller 1410 selects one of multiple processing chains within the DLL. In the example of FIG. 14, the DLL includes three processing chains, each including one of correlators CORR1, CORR2, and CORR3; one of loop filters L1, L2, and L3; one of NCOs N1, N2, and N3; and one of modulators M1, M2, and M3.

The non-coherent delay lock loop performs early and late gate correlation and subtracts the output after square law detection and thus generates a delay error discriminator characteristic, as described above. The delay error is then filtered using loop filters to generate a closed loop bandwidth consistent with the dynamics of receiver motion.

Where the user terminal is a handset with the motion of a person walking or in an automobile, the user dynamics have very low accelerations and the closed loop bandwidth can be very small, perhaps on the order of a 1 Hz closed loop bandwidth or even less. The resulting processing gain for a 1 second averaging time is given by $$\text{Processing Gain} = 832 \times (1s/0.0242) = 34380 \text{ or } 45.36 \text{ dB} \qquad (27)$$

Mixer 1422 produces a correlation signal. Search & initial acquisition unit 1424 locates the correlation peak in the correlation signal for each selected DTV signal. Unit 1424 transmits the location of each correlation peak to number-controlled oscillators N1, N2, and N3 as a correlation peak signal.

Each modulator M generates a code that replicates the properly timed field synchronization signals for the DTV signal 1404 being tracked by that modulator M. Each modulator M establishes the proper timing of its code based on the correlation peak signal received from units N1, N2, and N3. Each modulator M also generates observation interval gate signals representing the timing of the observation interval for the DTV signal 1404 being tracked by that modulator M. In one implementation, the observation interval includes guard times before and after each field synchronization signal.

In one implementation, much of the electronics are switched off in the periods between observation intervals to conserve power. According to this implementation, each modulator M transmits its observation interval gate signals to master controller 1410. Master controller 1410 generates power control signals based on the observation interval gate signals, and sends the power control signals to a power controller 1412. The power control signals instruct the power controller to apply or remove power from predetermined components of receiver 1400 according to the timing of the observation intervals.

Time-Gated Non-Coherent DLL

The received ATSC DTV signal is an 8 VSB signal. A noncoherent correlator cannot isolate the quadrature channel in order to perform a Hilbert transform on the quadrature channel alone. Thus the cross-correlation operation in receiver 1400 operates only on the receiver single sideband spectrum of the DTV signal and its autocorrelation function. The received signal spectrum is then the equivalent of a symmetrical signal spectrum with a 3 MHz modulation and a suppressed carrier at the center frequency. The autocorrelation function calculation is not affected by the phase relationships between upper and lower sidebands. Thus the autocorrelation function of this signal appears very similar to that of a raised cosine spectrum with half the symbol rate. Thus the autocorrelation function is approximately twice the width of the original raised cosine waveform. That this slight disadvantage is outweighed by the single sideband signal used with the simplicity of noncoherent detection is evident from the following analysis.

The received signal, after filtering by IF Filter 1418, can be represented in complex form (ignoring noise) as $$s[t]=x[t]e^{j\omega t} \qquad (28)$$

where $$x[t]=a[t]+b[t] \qquad (29)$$

The in-phase and quadrature components are a[t] and b[t], respectively. In the single sideband example the quadrature component b[t]=a'[t] where a' represents the Hilbert transform of the raised cosine PN sequence a.

Receiver noncoherent correlator 1422 forms a product r[t] of the sampled DTV signal and a reference waveform generated by a modulator M which has a frequency offset ν, a phase error θ, and delay error τ. The product r[t] is given by $$r[t]=x[t]e^{j\omega t}x*[t+\tau]e^{j(\omega t+\theta)} \qquad (30)$$

where x* represents the complex conjugate of x. The product xx* is given by $$p[t,\tau] = x[t]x*[t+\tau] = (a[t]+jb[t])(a[t+\tau]-jb[t+\tau]) \qquad (31)$$

$$= a[t]a[t+\tau] - ja[t]b[t+\tau] + ja[t+\tau]b[t] - b[t]b[t+\tau]$$

The autocorrelation functions of a and b are symmetrical. However the cross-correlation between a and b is not necessarily symmetrical. If a and b are two uncorrelated sequences then of course the cross-correlation function between a and b is zero. In the single sideband signal of course a and b are a and a', respectively, and are definitely not uncorrelated everywhere. In fact this cross-correlation function is not only not zero, but is asymmetrical. Thus the expected value of p is given by $$E[p[t,\tau] = R_a[\tau] + R_b[\tau] + jR_{ab}[-\tau] - jR_{ab}[\tau] \qquad (32)$$

$$= 2R_a[\tau] - j2R_{ab}[\tau]$$

where $R_a[\tau]=R_b[\tau]$ because a[t] and b[t] have the same power spectral density. Thus the IF output after square-law detection of its envelope is given by $$z[\tau]=\|E[p[t,\tau]]\|^2=4(R_a^2[\tau]+R_{aa'}^2[\tau]) \qquad (33)$$

Thus correlator 1422 uses the full amount of signal power and improves the noise performance by 3 dB because the quadrature Hilbert transform component indeed contains half the signal power. However the correlation peak is widened by a factor of approximately 2 because of the cross-correlation term $R_{aa'}^2[\tau]$. This cross-correlation term of course has a null at the origin where the autocorrelation has its peak and is symmetrical about the origin because it is now squared.

At this point, correlator 1422 has generated a correlation function between the received signal and the receiver reference code. This function is adequate for the initial search operation. However in order to provide a delay lock loop discriminator curve it is necessary to compute two such correlation functions with an early and late gate correlator and to subtract the two square-law detector outputs.

The tracking loop filter and loop gain are selected to match the dynamics of the handset motion as described in the documents cited above. In one implementation, a closed loop noise bandwidth of 1 Hz or less for the tracking function is selected.

Although the above description has used the complex envelope formulation, this analysis can be rewritten in the form of I and Q digital samples, as would be apparent to one skilled in the relevant art.

Time Gating

Figure 15:
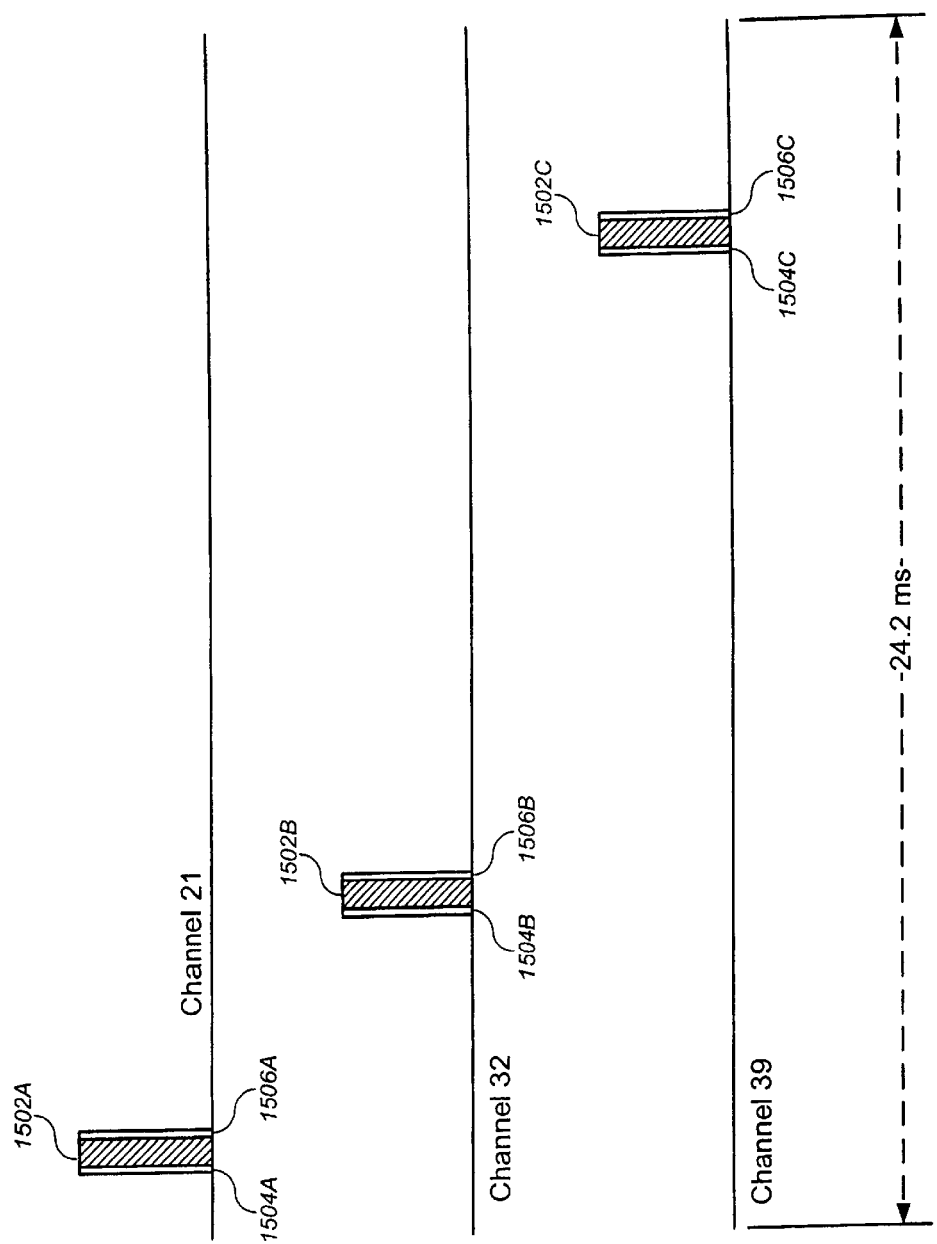
FIG. 15 shows a typical receiver time gating plan for tracking 3 DTV channels.

FIG. 15 shows a typical receiver time gating plan for tracking 3 DTV channels 21, 32, and 39. An observation interval 1502 is shown for each channel, surrounded by guard times 1504 and 1506. For clarity, the individual observation intervals are greatly exaggerated in FIG. 2; each observation interval has a duty factor of approximately 0.3%. Of course, implementations of the present invention can be used for tracking 4 or more DTV signals, as will be apparent to one skilled in the relevant art after reading this description.

The channel time gating turns on and off the received signal plus noise. Each observation interval lasts approximately 77.3 microseconds. The guard times are shown that allow for the settling time of the receiver filters and frequency synthesizers. Notice that the settling time of the frequency synthesizers are greatly reduced because two synthesizers are used so that one can be programmed while the other is active in ping-pong fashion.

Because each DTV channel operates on a different randomly-selected field synchronization clock phase, the likelihood of two field synchronization segments overlapping is small. In the unlikely event that the observation intervals for two of the DTV signals overlap, receiver 1400 alternates between the two DTV signals each field synchronization frame of 24.2 ms. This reduces processing gain by 3 dB, but occurs only infrequently.

Although constant stable voltages must be available continuously, most of the components of receiver 1400 are active only during the observation intervals. However, stable clock 1426, loop filters L and NCOs N must operate continuously.

The effective loop gain of the TGDLL of course depends on the duty factor. Because the TGDLL can track both position and velocity, the required closed loop noise bandwidth depends on the acceleration of the user handset. In most applications the acceleration is rather minor. These considerations are discussed in the documents cited above and in J. J. Spilker, Jr., Digital Communications by Satellite, Prentice-Hall, Englewood Cliffs, N.J., 1977, 1995, page 555, incorporated by reference herein.

If the handset is moving slowly or not at all, in addition to this time-gating operation, receiver 1400 can skip many 24.2 ms observation intervals entirely and thereby cut the duty factor and power consumption ever further. For example, receiver 1400 can operate for a 1 second interval every 30 seconds or more.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. While some of the implementations described herein function at baseband, equivalent intermediate frequency implementations will be apparent to one skilled in the relevant art after reading this description. Similarly, while some of the implementations described herein function at intermediate frequency, equivalent baseband I/Q implementations will be apparent to one skilled in the relevant art after reading this description. In either of these implementations, the received signals can be sampled and converted to digital form before processing at baseband.

In some implementations, all measurements of the DTV signals are taken simultaneously. This eliminates the need to know the frequency offset of the receiver clock. Therefore only one unknown remains: the time offset of the receiver clock. This technique also reduces power requirements in the receiver, thus prolonging battery life for a portable receiver. In these implementations, the NCOs remain constantly on to preserve the state of the code. Accordingly, other embodiments are within the scope of the following claims.

What is claimed is:

1. A method for use in determining the position of a user terminal, comprising:

receiving at the user terminal a digital television (DTV) broadcast signal transmitted by a DTV transmitter;

tracking a periodic component of the DTV signal using a delay-lock loop (DLL), including
selecting an observation interval based on the timing of the periodic component, and
turning on a portion of the DLL during the observation interval, and turning the portion off otherwise; and determining a pseudo-range between the user terminal and the DTV transmitter based on the DTV broadcast signal; and wherein
the position of the user terminal is determined based on the pseudo-range and a location of the DTV transmitter.

2. The method of claim 1, further comprising:

determining the position of the user terminal based on the pseudo-range and the location of the DTV transmitter.

3. The method of claim 2, wherein determining a position of the user terminal comprises:

adjusting the pseudo-range based on a difference between a transmitter clock at the DTV transmitter and a known time reference; and determining the position of the user terminal based on the adjusted pseudo-range and the location of the DTV transmitter.

4. The method of claim 1, wherein the DTV broadcast signal is an American Television Standards Committee (ATSC) DTV signal, and the pseudo-range is determined based on a known digital sequence in the ATSC frame.

5. The method of claim 4, wherein the known digital sequence is a synchronization code.

6. The method of claim 5, wherein the synchronization code is a Field Synchronization Segment within an ATSC data frame.

7. The method of claim 5, wherein the synchronization code is a Synchronization Segment within a Data Segment within an ATSC data frame.

8. The method of claim 1, wherein determining a position of the user terminal comprises:

determining an offset between a local time reference in the user terminal and a master time reference; and determining the position of the user terminal based on the pseudo-range, the location of the DTV transmitter, and the offset.

9. The method of claim 1, wherein determining a pseudo-range comprises:

correlating the DTV signal with a signal generated by the user terminal as the DTV signal is received to produce the pseudo-range.

10. The method of claim 1, further comprising:

tracking the pilot signal of the DTV signal using a phase-lock loop; and wherein
tracking the component of the DTV signal is based on the tracking of the pilot signal.

11. The method of claim 1, further comprising:
transmitting the pseudo-range to a location server configured to determine a position of the user terminal based on the pseudo-range and a location of the DTV transmitter.

12. The method of claim 1, wherein the position of the user terminal is determined by adjusting the pseudorange based on a difference between a transmitter clock at the transmitter of the broadcast analog television signal and a known time reference, and determining the position of the user terminal based on the adjusted pseudorange and the location of the TV transmitter.

13. The method of claim 1, further comprising:
determining a further pseudorange based on a further DTV signal; and
projecting the pseudorange and the further pseudorange to an instant of time, thereby eliminating any first order term in the clock of the user terminal.

14. Computer-readable media embodying instructions executable by a computer to perform a method for use in determining the position of a user terminal, the method comprising:
receiving at the user terminal a digital television (DTV) broadcast signal transmitted by a DTV transmitter;
tracking a periodic component of the DTV signal using a delay-lock loop (DLL), including
selecting an observation interval based on the timing of the periodic component, and
turning on a portion of the DLL during the observation interval, and turning the portion off otherwise; and
determining a pseudo-range between the user terminal and the DTV transmitter based on the DTV broadcast signal; and wherein
the position of the user terminal is determined based on the pseudo-range and a location of the DTV transmitter.

15. The media of claim 14, wherein the method further comprises:
determining the position of the user terminal based on the pseudo-range and the location of the DTV transmitter.

16. The media of claim 15, wherein determining a position of the user terminal comprises:
adjusting the pseudo-range based on a difference between a transmitter clock at the DTV transmitter and a known time reference; and
determining the position of the user terminal based on the adjusted pseudo-range and the location of the DTV transmitter.

17. The media of claim 14, wherein the DTV broadcast signal is an American Television Standards Committee (ATSC) DTV signal, and the pseudo-range is determined based on a known digital sequence in the ATSC frame.

18. The media of claim 17, wherein the known digital sequence is a synchronization code.

19. The media of claim 18, wherein the synchronization code is a Field Synchronization Segment within an ATSC data frame.

20. The media of claim 18, wherein the synchronization code is a Synchronization Segment within a Data Segment within an ATSC data frame.

21. The media of claim 14, wherein determining a position of the user terminal comprises:
determining an offset between a local time reference in the user terminal and a master time reference; and
determining the position of the user terminal based on the pseudo-range, the location of the DTV transmitter, and the offset.

22. The media of claim 14, wherein determining a pseudo-range comprises:
correlating the DTV signal with a signal generated by the user terminal as the DTV signal is received to produce the pseudo-range.

23. The media of claim 14, wherein the method further comprises:
tracking the pilot signal of the DTV signal using a phase-lock loop; and wherein
tracking the component of the DTV signal is based on the tracking of the pilot signal.

24. The media of claim 14, wherein the method further comprises:
transmitting the pseudo-range to a location server configured to determine a position of the user terminal based on the pseudo-range and a location of the DTV transmitter.

25. The media of claim 14, wherein the position of the user terminal is determined by adjusting the pseudorange based on a difference between a transmitter clock at the transmitter of the broadcast analog television signal and a known time reference, and determining the position of the user terminal based on the adjusted pseudorange and the location of the TV transmitter.

26. The media of claim 14, wherein the method further comprises:
determining a further pseudorange based on a further DTV signal; and
projecting the pseudorange and the further pseudorange to an instant of time, thereby eliminating any first order term in the clock of the user terminal.

27. An apparatus for use in determining the position of a user terminal, comprising:
means for receiving at the user terminal a digital television (DTV) broadcast signal transmitted by a DTV transmitter;
means for tracking a periodic component of the DTV signal using a delay-lock loop (DLL), including
means for selecting an observation interval based on the timing of the periodic component, and
means for turning on a portion of the DLL during the observation interval, and turning the portion off otherwise; and
means for determining a pseudo-range between the user terminal and the DTV transmitter based on the DTV broadcast signal; and wherein
the position of the user terminal is determined based on the pseudo-range and a location of the DTV transmitter.

28. The apparatus of claim 27, further comprising:
means for determining the position of the user terminal based on the pseudo-range and the location of the DTV transmitter.

29. The apparatus of claim 28, wherein means for determining a position of the user terminal comprises:
means for adjusting the pseudo-range based on a difference between a transmitter clock at the DTV transmitter and a known time reference; and
means for determining the position of the user terminal based on the adjusted pseudo-range and the location of the DTV transmitter.

30. The apparatus of claim 27, wherein the DTV broadcast signal is an American Television Standards Committee (ATSC) DTV signal, and the pseudo-range is determined based on a known digital sequence in the ATSC frame.

31. The apparatus of claim 30, wherein the known digital sequence is a synchronization code.

32. The apparatus of claim 31, wherein the synchronization code is a Field Synchronization Segment within an ATSC data frame.

33. The apparatus of claim 31, wherein the synchronization code is a Synchronization Segment within a Data Segment within an ATSC data frame.

34. The apparatus of claim 27, wherein means for determining a position of the user terminal comprises:
means for determining an offset between a local time reference in the user terminal and a master time reference; and
means for determining the position of the user terminal based on the pseudo-range, the location of the DTV transmitter, and the offset.

35. The apparatus of claim 27, wherein means for determining a pseudo-range comprises:
means for correlating the DTV signal with a signal generated by the user terminal as the DTV signal is received to produce the pseudo-range.

36. The apparatus of claim 27, further comprising:
means for tracking the pilot signal of the DTV signal using a phase-lock loop; and wherein
means for tracking the component of the DTV signal is based on the tracking of the pilot signal.

37. The apparatus of claim 27, further comprising:
means for transmitting the pseudo-range to a location server configured to determine a position of the user terminal based on the pseudo-range and a location of the DTV transmitter.

38. The apparatus of claim 27, wherein the position of the user terminal is determined by adjusting the pseudorange based on a difference between a transmitter clock at the transmitter of the broadcast analog television signal and a known time reference, and determining the position of the user terminal based on the adjusted pseudorange and the location of the TV transmitter.

39. The apparatus of claim 27, further comprising:
means for determining a further pseudorange based on a further DTV signal; and
means for projecting the pseudorange and the further pseudorange to an instant of time, thereby eliminating any first order term in the clock of the user terminal.

40. An apparatus for use in determining the position of a user terminal, comprising:
an antenna to receive at the user terminal a digital television (DTV) broadcast signal transmitted by a DTV transmitter;
a receiver to track a periodic component of the DTV signal using a delay-lock loop (DLL), including a controller to
select an observation interval based on the timing of the periodic component, and
turn on a portion of the DLL during the observation interval, and turn the portion off otherwise; and
a processor to determine a pseudo-range between the user terminal and the DTV transmitter based on the DTV broadcast signal; and wherein
the position of the user terminal is determined based on the pseudo-range and a location of the DTV transmitter.

41. The apparatus of claim 40, wherein the processor determines the position of the user terminal based on the pseudo-range and the location of the DTV transmitter.

42. The apparatus of claim 41, wherein the processor:
adjusts the pseudo-range based on a difference between a transmitter clock at the DTV transmitter and a known time reference; and
determines the position of the user terminal based on the adjusted pseudo-range and the location of the DTV transmitter.

43. The apparatus of claim 40, wherein the DTV broadcast signal is an American Television Standards Committee (ATSC) DTV signal, and the pseudo-range is determined based on a known digital sequence in the ATSC frame.

44. The apparatus of claim 43, wherein the known digital sequence is a synchronization code.

45. The apparatus of claim 44, wherein the synchronization code is a Field Synchronization Segment within an ATSC data frame.

46. The apparatus of claim 44, wherein the synchronization code is a Synchronization Segment within a Data Segment within an ATSC data frame.

47. The apparatus of claim 40, wherein the processor:
determines an offset between a local time reference in the user terminal and a master time reference; and
determines the position of the user terminal based on the pseudo-range, the location of the DTV transmitter, and the offset.

48. The apparatus of claim 40, wherein the processor correlates the DTV signal with a signal generated by the user terminal as the DTV signal is received to produce the pseudo-range.

49. The apparatus of claim 40, further comprising:
a phase-lock loop to track the pilot signal of the DTV signal; and wherein
tracking the component of the DTV signal is based on the tracking of the pilot signal.

50. The apparatus of claim 40, further comprising:
a transmitter to transmit the pseudo-range to a location server configured to determine a position of the user terminal based on the pseudo-range and a location of the DTV transmitter.

51. The apparatus of claim 40, wherein the position of the user terminal is determined by adjusting the pseudorange based on a difference between a transmitter clock at the transmitter of the broadcast analog television signal and a known time reference, and determining the position of the user terminal based on the adjusted pseudorange and the location of the TV transmitter.

52. The apparatus of claim 40, wherein the processor:
determines a further pseudorange based on a further DTV signal; and
projects the pseudorange and the further pseudorange to an instant of time, thereby eliminating any first order term in the clock of the user terminal.

* * * * *